(12) United States Patent
Smith et al.

(10) Patent No.: US 8,625,200 B2
(45) Date of Patent: *Jan. 7, 2014

(54) HEAD-MOUNTED DISPLAY APPARATUS EMPLOYING ONE OR MORE REFLECTIVE OPTICAL SURFACES

(75) Inventors: David Alan Smith, Cary, NC (US); Gregory A. Harrison, Oviedo, FL (US); Gary E. Wiese, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/211,372

(22) Filed: Aug. 17, 2011

(65) Prior Publication Data

US 2012/0120499 A1    May 17, 2012

Related U.S. Application Data

(60) Provisional application No. 61/405,440, filed on Oct. 21, 2010, provisional application No. 61/417,325, filed on Nov. 26, 2010, provisional application No. 61/417,326, filed on Nov. 26, 2010, provisional application No. 61/417,327, filed on Nov. 26, 2010, provisional application No. 61/417,328, filed on Nov. 26, 2010, provisional application No. 61/427,530, filed on Dec. 28, 2010.

(51) Int. Cl.
*G02B 27/10*    (2006.01)
*G09G 5/00*    (2006.01)

(52) U.S. Cl.
USPC ............................................. 359/631; 345/8

(58) Field of Classification Search
USPC .................................. 359/629–632; 345/7–9
See application file for complete search history.

(56) References Cited

U.S. PATENT DOCUMENTS

| | | |
|---|---|---|
| 3,880,509 A | 4/1975 | Herndon et al. |
| 4,026,641 A | 5/1977 | Bosserman et al. |
| 5,309,169 A | 5/1994 | Lippert |
| 5,325,386 A | 6/1994 | Jewell et al. |
| 5,347,400 A | 9/1994 | Hunter |

(Continued)

FOREIGN PATENT DOCUMENTS

| | | |
|---|---|---|
| CA | 2750287 A1 | 11/2011 |
| CA | 2750287 C | 7/2012 |

(Continued)

OTHER PUBLICATIONS

International Search Report, May 16, 2012.

(Continued)

*Primary Examiner* — Alicia M Harrington
(74) *Attorney, Agent, or Firm* — Terry M. Sanks, Esq.; Beusse Wolter Sanks Mora & Maire, P.A.

(57) ABSTRACT

Head-mounted displays (100) are disclosed which include a frame (107), an image display system (110) supported by the frame (107), and a reflective surface, e.g., a free-space, ultra-wide angle, reflective optical surface (a FS/UWA/RO surface) (120), supported by the frame (107). In certain embodiments, the reflective surface (120) produces spatially-separated virtual images that are angularly separated by at least 100, 150, or 200 degrees. Methods and apparatus for designing reflective optical surfaces, including FS/UWA/RO surfaces, for use in head-mounted displays (100) are also disclosed.

27 Claims, 12 Drawing Sheets

(56) References Cited

U.S. PATENT DOCUMENTS

| | | | |
|---|---|---|---|
| 5,561,538 A | 10/1996 | Kato et al. | |
| 5,572,343 A | 11/1996 | Okamura et al. | |
| 5,581,271 A | 12/1996 | Kraemer | |
| 5,699,194 A | 12/1997 | Takahashi | |
| 5,701,132 A | 12/1997 | Kollin et al. | |
| 5,701,202 A | 12/1997 | Takahashi et al. | |
| 5,712,649 A | 1/1998 | Tosaki et al. | |
| 5,774,268 A | 6/1998 | Takahashi | |
| 5,798,739 A | 8/1998 | Teitel et al. | |
| 5,834,676 A | 11/1998 | Elliott | |
| 5,844,530 A | 12/1998 | Tosaki | |
| 5,982,343 A | 11/1999 | Iba et al. | |
| 6,140,979 A | 10/2000 | Gerhard et al. | |
| 6,140,980 A | 10/2000 | Spitzer et al. | |
| 6,160,666 A | 12/2000 | Rallison et al. | |
| 6,201,646 B1 | 3/2001 | Togino et al. | |
| 6,215,593 B1 | 4/2001 | Bruce | |
| 6,266,194 B1 | 7/2001 | Tanijiri | |
| 6,445,362 B1 | 9/2002 | Tegreene | |
| 6,522,474 B2 | 2/2003 | Cobb et al. | |
| 6,633,304 B2 | 10/2003 | Anabuki et al. | |
| 6,646,811 B2 | 11/2003 | Inoguchi | |
| 6,704,128 B2 | 3/2004 | Takeyama et al. | |
| 6,731,434 B1 | 5/2004 | Hua et al. | |
| 6,771,423 B2 | 8/2004 | Geist | |
| 6,795,042 B1 | 9/2004 | Nagata et al. | |
| 6,813,085 B2 | 11/2004 | Richards | |
| 6,873,471 B2 | 3/2005 | Coates | |
| 6,919,866 B2 | 7/2005 | Kanevsky et al. | |
| 7,002,551 B2 | 2/2006 | Azuma et al. | |
| 7,009,773 B2 | 3/2006 | Chaoulov et al. | |
| 7,063,256 B2 | 6/2006 | Anderson et al. | |
| 7,095,562 B1 | 8/2006 | Peng et al. | |
| 7,119,965 B1 * | 10/2006 | Rolland et al. | 359/630 |
| 7,151,639 B2 | 12/2006 | Lung | |
| 7,324,081 B2 | 1/2008 | Friedrich et al. | |
| 7,385,600 B2 | 6/2008 | Marion | |
| 7,391,573 B2 | 6/2008 | Amitai | |
| 7,432,879 B2 | 10/2008 | Schonlau | |
| 7,499,217 B2 | 3/2009 | Cakmakci et al. | |
| 7,545,571 B2 | 6/2009 | Garoutte et al. | |
| 7,573,525 B2 | 8/2009 | Yamasaki | |
| 7,605,773 B2 | 10/2009 | Janssen | |
| 7,613,356 B2 | 11/2009 | Uchiyama et al. | |
| 7,623,294 B2 | 11/2009 | Harada et al. | |
| 7,732,694 B2 | 6/2010 | Rosenberg | |
| 7,751,122 B2 | 7/2010 | Amitai | |
| 7,804,507 B2 | 9/2010 | Yang et al. | |
| 7,812,815 B2 | 10/2010 | Banerjee et al. | |
| 7,843,403 B2 | 11/2010 | Spitzer | |
| 7,928,927 B1 | 4/2011 | Krenz et al. | |
| 7,949,295 B2 | 5/2011 | Kumar et al. | |
| 8,046,719 B2 | 10/2011 | Skourup et al. | |
| 8,059,342 B2 | 11/2011 | Burke | |
| 2001/0033401 A1 | 10/2001 | Kasai et al. | |
| 2002/0036649 A1 | 3/2002 | Kim et al. | |
| 2002/0094189 A1 | 7/2002 | Navab et al. | |
| 2002/0163486 A1 | 11/2002 | Ronzani et al. | |
| 2002/0186179 A1 | 12/2002 | Knowles | |
| 2002/0196554 A1 * | 12/2002 | Cobb et al. | 359/633 |
| 2004/0130783 A1 | 7/2004 | Solomon | |
| 2005/0046953 A1 | 3/2005 | Repetto et al. | |
| 2006/0103590 A1 | 5/2006 | Divon | |
| 2006/0281061 A1 | 12/2006 | Hightower et al. | |
| 2007/0132785 A1 | 6/2007 | Ebersole et al. | |
| 2007/0219760 A1 | 9/2007 | Yang et al. | |
| 2007/0236800 A1 | 10/2007 | Cakmakci et al. | |
| 2007/0243916 A1 | 10/2007 | Lee | |
| 2008/0204731 A1 | 8/2008 | Williams | |
| 2008/0309586 A1 | 12/2008 | Vitale | |
| 2009/0002574 A1 | 1/2009 | Sorek et al. | |
| 2009/0122385 A1 | 5/2009 | Hilton | |
| 2009/0153437 A1 | 6/2009 | Aharoni | |
| 2010/0002154 A1 | 1/2010 | Hua | |
| 2010/0060551 A1 | 3/2010 | Sugiyama et al. | |
| 2010/0103075 A1 | 4/2010 | Kalaboukis et al. | |
| 2010/0103196 A1 | 4/2010 | Kumar et al. | |
| 2010/0149073 A1 | 6/2010 | Chaum et al. | |
| 2010/0171680 A1 | 7/2010 | Lapidot et al. | |
| 2010/0238161 A1 | 9/2010 | Varga et al. | |
| 2010/0245387 A1 | 9/2010 | Bachelder et al. | |
| 2010/0321409 A1 | 12/2010 | Komori et al. | |
| 2011/0018903 A1 | 1/2011 | Lapstun et al. | |
| 2011/0057863 A1 | 3/2011 | Sugihara et al. | |
| 2011/0130636 A1 | 6/2011 | Daniel et al. | |
| 2011/0213664 A1 | 9/2011 | Osterhout et al. | |
| 2011/0214082 A1 | 9/2011 | Osterhout et al. | |
| 2011/0221656 A1 | 9/2011 | Haddick et al. | |
| 2011/0221657 A1 | 9/2011 | Haddick et al. | |
| 2011/0221658 A1 | 9/2011 | Haddick et al. | |
| 2011/0221659 A1 | 9/2011 | King, III et al. | |
| 2011/0221668 A1 | 9/2011 | Haddick et al. | |
| 2011/0221669 A1 | 9/2011 | Shams et al. | |
| 2011/0221670 A1 | 9/2011 | King, III et al. | |
| 2011/0221671 A1 | 9/2011 | King, III et al. | |
| 2011/0221672 A1 | 9/2011 | Osterhout et al. | |
| 2011/0221793 A1 | 9/2011 | King, III et al. | |
| 2011/0221896 A1 | 9/2011 | Haddick et al. | |
| 2011/0221897 A1 | 9/2011 | Haddick et al. | |
| 2011/0222745 A1 | 9/2011 | Osterhout et al. | |
| 2011/0225536 A1 | 9/2011 | Shams et al. | |
| 2011/0227812 A1 | 9/2011 | Haddick et al. | |
| 2011/0227813 A1 | 9/2011 | Haddick et al. | |
| 2011/0227820 A1 | 9/2011 | Haddick et al. | |
| 2011/0231757 A1 | 9/2011 | Haddick et al. | |
| 2011/0250962 A1 | 10/2011 | Feiner et al. | |

FOREIGN PATENT DOCUMENTS

| | | |
|---|---|---|
| DE | 102007009828 A1 | 9/2008 |
| EP | 1418458 A1 | 5/2004 |
| GB | 2461907 A | 1/2010 |
| JP | 2002287077 A | 10/2002 |
| JP | 2006091477 A | 4/2006 |
| JP | 2008058461 A | 3/2008 |
| WO | 2005017729 A2 | 2/2005 |
| WO | 2009094643 A2 | 7/2009 |
| WO | 2010123934 A1 | 10/2010 |
| WO | 2011114149 A1 | 9/2011 |

OTHER PUBLICATIONS

Kiyokawa, Kiyoshi, "A Wide Field-of-View Head Mounted Projective Display Using Hyperbolic Half-Silvered Mirrors," IEEE, Nov. 16, 2007, Cybermedia Center, Osaka University, Osaka, Japan.

Jeon et al., "Mosaicing a Wide Geometric Field of View for Effective Interaction in Augmented Reality,"Mixed and Augmented Reality, 6th IEEE and ACM International Symposium, Mar. 2007, pp. 265-266.

Cakmakci et al., "Optical Free-Form Surfaces in Off-Axis Head-Worn Display Design," Mixed and Augmented Reality, 7th IEEE/ACM International Symposium; Mar. 2008, pp. 29-32.

Yang et al., "Hybrid Diffractive-Refractive 67°-Diagonal Field of View Optical See-Through Head-Mounted Display," Institute of Modern Optics, Aug. 17, 2005, pp. 351-355, vol. 116, No. 7, Optik-Internat, Nankai University, Tianjin, China.

Takeda et al., "Design and Implementation of a Wide Field-of-View Head Mounted Projective Display," Journal of the Institute of Image Information and Television Engineers, Jun. 2009, pp. 794-800, vol. 63, No. 6, Institute of Image Information and Television Engineers, Osaka, Japan.

Nagahara et al., Wide Field of View Catadioptrical Head Mounted Display, Transactions of the Institute of Electronics, Information and Communication Engineers D-II, Jan. 2005, pp. 95-104, vol. J88D-II, No. 1, Inst. Electron. Inf. & Commun. Eng, Japan.

Pratt, P. D., "Advanced Helmet Sight Reticle Assembly (AHRA)," Jul. 1976, p. 364, Honeywell Inc., Minneapolis Minn. Systems and Research Div.

Nagahara et al., "Wide Field of View Head Mounted Display for Tele-Presence with An Omnidirectional Image Sensor," Computer Vision and Pattern Recognition Workshop, Jun. 16-22, 2003, vol. 7, p. 86.

(56) References Cited

OTHER PUBLICATIONS

Takeda et al., "Poster: A Virtual Walkthrough System with a Wide Field-of-View Stereo Head Mounted Projective Display," 3D User Interfaces, IEEE Symposium, Mar. 14-15, 2009, p. 149, Lafayette, LA.

Mori et al., "A Wide-View Parallax-Free Eye-Mark Recorder with a Hyperboloidal Half-Silvered Mirror and Appearance-Based Gaze Estimation," Visualization and Computer Graphics, IEEE Transactions, Aug. 26, 2010, p. 1, vol. PP, No. 99.

Okuma et al., "An Augmented Reality System Using a Real-Time Vision Based Registration," Pattern Recognition, 1998. Proceedings. Fourteenth International Conference, Aug. 16-20, 1998, p. 1226, vol. 2.

Parviz, Babak A., "Augmented Reality in a Contact Lens," IEEE Spectrum, Sep. 2009, http://spectrum.ieee.org/biomedical/bionics/augmented-reality-in-a-contact-lens/0.

Lingley et al., "A Single-Pixel Wireless Contact Lens Display," J. Micromech. Microeng., Nov. 22, 2011, 21 (2011) 125014 (8pp); doi:10.1088/0960-137/21/12/125014; Received Jun. 9, 2011, in final form Sep. 19, 2011.

Vuzik High Resolution Video Eyewear—Products; Retrieved from http://www.vuzik.com.consumer; Retrieved Dec. 30, 2011.

Lumus—Consumer Market Products; Retrieved from http://www.lumus-optical.com/index.php?option=com_content&task=view&id=9&Itemid=15; Retrieved Dec. 30, 2011.

Head Mounted Displays from INITION; Retrieved from http://www.inition.co.uk/3D-Technologies/productsection/31; Retrieved on Dec. 30, 2011.

Azuma et al., "Improving Static and Dynamic Registration in an Optical See-Through HMD," Proc. of ACM SIGGRAPH 1994, Computer Graphics, Annual Conference Series, Orlando, FL, Jul. 24-29, 1994, pp. 197-204.

Cakmakci et al., "Meshfree Approximation Methods for Free-Form Surface Representation in Optical Design With Applications to Head-Worn Displays," Proc. of SPIE, 2008, vol. 7061, 70610D-1, http://www.creol.ucf.edu/Research/Publications/2012.pdf.

Hastings, A., "Eye Box Performance Parameters for Non Pupil Forming. Head/Helmet Mounted Displays," Tutorial, OPT 521, Dec. 6, 2006, www.optics.arizona.edu/optomech/.../tutorials/HastingsTutorial1.doc.

Hopkins et al., "Simple Thin Lens Optical Systems," US Department of Defense, Military Standardization Handbook: Optical Design, MIL-HDBK-141, Oct. 5, 1962, FSC-6650, Section 7, http://www.optics.arizona.edu/opti510I/references/mil-hdbk-141/ch$7_{13}$ 12.pdf Klepper, Sebastian, "Augmented Reality—Display Systems," Technische Univeritaet Muenchen, Munich, Germany, 2007, http://camper.in.turn.de/twiki/pub/Chair/TeachingSs07ArProseminar/1_Display-Systems_Klepper_Report.pdf.

Melzer et al. "Guidelines for HMD Design," in Helmet-Mounted Displays: Sensation, Pereption and Cognition Issues, C. E. Rash et al., ed., U.S. Army Aeromedical Research Laboratory, Fort Rucker, AL, 2009, Chapter 17, http://www.usaarl.army.mil/publications.hmd_book09/files/Section%2026%20-%20Chapter17%20Guidelines%20for%20HMD%20design.pdf, Jan. 2009.

Melzer, James E., "Head-Mounted Displays," The Avionics Handbook, Cary R. Spitzer, ed., CRC Press, Boca Raton FL, 2001, Chapter 5, http://www.davi.ws/avionics/TheAvionicsHandbook_Cap_5.pdf.

Nagahara et al., "Super Wide Viewer Using Catadioptric Optics," Proc. ACM Symposium on Virtual Reality Software and Technology (VRST2003), Oct. 2003, pp. 169-175, Osaka, Japan.

Nagahara et al., "Wide Field of View Catadioptrical Head-Mounted Display," Proc. of 2003 IEEE/RSJ, Intl. Conference on Intelligent Robots and Systems, Las Vegas NV, Oct. 2003, 3738-3743.

Livingston et al., "An Augmented Reality System for Military Operations in Urban Terrain," Proc of I/ITSEC '02, Orlando FL, Dec. 2-5, 2002.

Vanden Brook, T., "Device Helps Pinpoint Snipers: Technology Is Critical for U.S. Combat Troops," USA Today, Wednesday, Mar. 2, 2011.

Schwald et al., An Augmented Reality System for Training and Assistance to Maintenance in the Industrial Context, Journal of WSCG, Feb. 3-7, 2003, vol. 11, No. 1, Plzen, Czech Republic.

Rolland et al., "Development of Head-Mounted Projection Displays for Distributed, Collaborative, Augmented Reality Applications," Oct. 2005, Presence, vol. 14, No. 5, pp. 528-549.

Kato et al., "Marker Tracking and HMD Calibration for a Video-based Augmented Reality Conferencing System," 1999.

Kato et al., "Virtual Object Manipulation on a Table-Top AR Environment," 2000.

Billinghurst et al., "Collaboration with Tangible Augmented Reality Interfaces," 2002.

Liu et al., "An Optical See-Through Head Mounted Display with Addressable Focal Planes," IEEE Int'l Symposium on Mixed and Augmented Reality Sep. 15-18, 2008, Cambridge, UK.

Bayer et al., "Introduction to Helmet-Mounted Displays," 2009, U.S. Army Medical Dept., Medical Research and Material Command.

Rolland et al., "Invited Paper: Head-Worn Displays—Lens Design," 48th Annual SID Symposium, Seminar, and Exhibition 2010, Display Week 2010, May 23, 2010-May 28, 2010, vol. 2, pp. 855-858, Society for Information Display.

Spitzer et al., "Video I/O Interface for Wearable Computers," Proceedings of the SPIE—The International Society for Optical Engineering, vol. 3689, pp. 278-283, 1999, Conference: Helmet- and Head-Mounted Displays IV, Apr. 5-6, 1999, Orlando, FL, SPIE—Int. Soc. Opt. Eng, USA.

Upton et al., "Eyeglass Head-Up Display [Vibrating Fiber Optic Assembly," 1981 SID International Symposium. Digest of Papers, Apr. 28-30, 1981, vol. XII, pp. 48-49, New York, NY, SID, Los Angeles, CA.

Rose, Melinda, "Microdisplays: Coming Soon to An Eye Near You?" Photonics Spectra, Sep. 2008, vol. 42, No. 9, pp. 68-69, Laurin Publishing Co. Inc.

Kurze et al., "Smart Glasses: An Open Environment for AR Apps," 2010 9th IEEE International Symposium on Mixed and Augmented Reality (ISMAR). Science & Technology Papers, Oct. 13-16, 2010, 313, 2010, Seoul, South Korea.

Schonlau et al., "Personal Viewer: A Wide-Field Low-Profile See-Through Eyewear Display," Proceedings of the SPIE—The International Society for Optical Engineering, Apr. 14-16, 2004, vol. 5443, No. 1, pp. 277-287, Orlando, FL, SPIE—Int. Soc. Opt. Eng.

Mukawa et al., "A Full Color Eyewear Display Using Holographic Planar Waveguides," IDW '08—Proceedings of the 15th International Display Workshops, Dec. 3, 2008-Dec. 5, 2008, vol. 1, pp. 259-262, Inst. of Image Information and Television Engineers.

Mukawa et al., "A Full-Color Eyewear Display Using Planar Waveguides with Reflection vol. Holograms," Journal of the Society for Information Display, vol. 17, No. 3, pp. 185-193, Mar. 2009, Society for Information Display.

Dejong, C. Dean, "Full-Color, See-Through, Daylight-Readable, Goggle-Mounted Display," Proceedings of SPIE—The International Society for Optical Engineering, Apr. 28, 2011-Apr. 28, 2011, vol. 8041, SPIE.

von Waldkirch et al., "Spectacle-Based Design of Wearable See-Through Display for Accommodation-Free Viewing," Pervasive Computing. Second International Conference, Pervasive 2004. Proceedings. (Lecture Notes in Comput. Sci. vol. 3001), Apr. 18-23, 2004, 106-23, Springer-Verlag, Berlin, Germany.

Ayras et al., "Near-To-Eye Display Based on Retinal Scanning and a Diffractive Exitpupil Expander," Proceedings of SPIE—The International Society for Optical Engineering, Apr. 12, 2010-Apr. 15, 2010, vol. 7723, No. 77230V, SPIE.

Ferscha et al., "Wearable Displays for Everyone!" IEEE Pervasive Computing, Jan.-Mar. 2010, vol. 9, No. 1, pp. 7-10, Institute of Electrical and Electronics Engineers Inc.

"SEOS Ultra Wide Field-of-View Head Mounted Display," http://cgsd.com/SEOSHMD/, Jan. 23, 2003.

* cited by examiner

HEAD-MOUNTED DISPLAY APPARATUS EMPLOYING ONE OR MORE REFLECTIVE OPTICAL SURFACES

CROSS-REFERENCE TO RELATED APPLICATIONS

This application claims priority under 35 U.S.C. 119(e) to U.S. Provisional Application No. 61/405,440 (entitled HEAD-MOUNTED DISPLAY, filed Oct. 21, 2010), U.S. Provisional Application No. 61/417,325 (entitled CURVED-STACKED FRESNEL ARCHITECTURE, filed Nov. 26, 2010), U.S. Provisional Application No. 61/417,326 (entitled CURVED-BEAM SPLITTER ARCHITECTURE, filed Nov. 26, 2010), U.S. Provisional Application No. 61/417,327 (entitled COMBINED ARCHITECTURE OF FRESNEL LENSE AND FLAT BEAM SPLITTER, filed Nov. 26, 2010), U.S. Provisional Application No. 61/417,328 (entitled COMBINED ARCHITECTURE OF FRESNEL LENSE AND CURVED BEAM SPLITTER, filed Nov. 26, 2010), and U.S. Provisional Application No. 61/427,530 (entitled CURVED MIRROR FOR HEAD MOUNTED DISPLAY, filed Dec. 28, 2010), which are incorporated herein in their entireties by reference.

FIELD

This disclosure relates to head-mounted display apparatus employing one or more reflective optical surfaces, e.g., one or more free space, ultra-wide angle, reflective optical surfaces (hereinafter abbreviated as "FS/UWA/RO surfaces"). More particularly, the disclosure relates to head-mounted display apparatus in which reflective optical surfaces such as FS/UWA/RO surfaces are employed to display imagery from a light-emitting display system held in close proximity to a user's eye.

BACKGROUND

A head-mounted display such as a helmet-mounted display or eyeglass-mounted display (abbreviated herein as a "HMD") is a display device worn on the head of an individual that has one or more small display devices located near one eye or, more commonly, both eyes of the user. FIG. 1 shows the basic elements of one type of HMD which includes a display 11, a reflective optical surface 13, and an eye 15 having a center of rotation 17. As shown in this figure, light 19 from display 11 is reflected by surface 13 and enters the user's eye 15.

Some HMDs display only simulated (computer-generated) images, as opposed to real-world images, and accordingly are often referred to as "virtual reality" or immersive HMDs. Other HMDs superimpose (combine) a simulated image upon a non-simulated, real-world image. The combination of non-simulated and simulated images allows the HMD user to view the world through, for example, a visor or eyepiece on which additional data relevant to the task to be performed is superimposed onto the forward field of view (FOV) of the user. This superposition is sometimes referred to as "augmented reality" or "mixed reality."

Combining a non-simulated, real-world view with a simulated image can be achieved using a partially-reflective/partially-transmissive optical surface (a "beam splitter") where the surface's reflectivity is used to display the simulated image as a virtual image (in the optical sense) and the surface's transmissivity is used to allow the user to view the real world directly (referred to as an "optical see-through system"). Combining a real-world view with a simulated image can also be done electronically by accepting video of a real world view from a camera and mixing it electronically with a simulated image using a combiner (referred to as a "video see-through system"). The combined image can then be presented to the user as a virtual image (in the optical sense) by means of a reflective optical surface, which in this case need not have transmissive properties.

From the foregoing, it can be seen that reflective optical surfaces can be used in HMDs which provide the user with: (i) a combination of a simulated image and a non-simulated, real world image, (ii) a combination of a simulated image and a video image of the real world, or (iii) purely simulated images. (The last case is often referred to as an "immersive" system.) In each of these cases, the reflective optical surface produces a virtual image (in the optical sense) that is viewed by the user. Historically, such reflective optical surfaces have been part of optical systems whose exit pupils have substantially limited not only the dynamic field of view available to the user, but also the static field of view. Specifically, to see the image produced by the optical system, the user needed to align his/her eye with the optical system's exit pupil and keep it so aligned, and even then, the image visible to the user would not cover the user's entire full static field of view, i.e., the prior optical systems used in HMDs that have employed reflective optical surfaces have been part of pupil-forming systems and thus have been exit-pupil-limited.

The reason the systems have been so limited is the fundamental fact that the human field of view is remarkably large. Thus, the static field of view of a human eye, including both the eye's foveal and peripheral vision, is on the order of ~150° in the horizontal direction and on the order of ~130° in the vertical direction. (For the purposes of this disclosure, 150 degrees will be used as the straight ahead static field of view of a nominal human eye.) Well-corrected optical systems having exit pupils capable of accommodating such a large static field of view are few and far between, and when they exist, they are expensive and bulky.

Moreover, the operational field of view of the human eye (dynamic field of view) is even larger since the eye can rotate about its center of rotation, i.e., the human brain can aim the human eye's foveal+peripheral field of view in different directions by changing the eye's direction of gaze. For a nominal eye, the vertical range of motion is on the order of ~40° up and ~60° down and the horizontal range of motion is on the order of ±~50° from straight ahead. For an exit pupil of the size produced by the types of optical systems previously used in HMDs, even a small rotation of the eye would substantially reduce what overlap there was between the eye's static field of view and the exit pupil and larger rotations would make the image disappear completely. Although theoretically possible, an exit pupil that would move in synchrony with the user's eye is impractical and would be prohibitively expensive.

In view of these properties of the human eye, there are three fields of view which are relevant in terms of providing an optical system which allows a user to view an image generated by an image display system in the same manner as he/she would view the natural world. The smallest of the three fields of view is that defined by the user's ability to rotate his/her eye and thus scan his/her fovea over the outside world. The maximum rotation is on the order of ±50° from straight ahead, so this field of view (the foveal dynamic field of view) is approximately 100°. The middle of the three fields of view is the straight ahead static field of view and includes both the user's foveal and peripheral vision. As discussed above, this field of view (the foveal+peripheral static field of view) is on the order of 150°. The largest of the three fields of view is that defined by the user's ability to rotate his/her eye and thus scan his/her foveal plus his/her peripheral vision over the outside world. Based on a maximum rotation on the order of ±50° and a foveal+peripheral static field of view on the order of 150°, this largest field of view (the foveal+peripheral dynamic field of view) is on the order of 200°. This increasing scale of fields of view from at least 100 degrees to at least 150 degrees and then to at least 200 degrees provides corresponding benefits to the user in terms of his/her ability to view images generated by an image display system in an intuitive and natural manner.

There thus exists a need for head-mounted displays that have improved compatibility with the field of view, both static and dynamic, of the human eye. The present disclosure is directed to this need and provides head-mounted displays that employ reflective optical surfaces which provide an ultra-wide angle field of view.

DEFINITIONS

In the remainder of this disclosure and in the claims, the phrase "virtual image" is used in its optical sense, i.e., a virtual image is an image that is perceived to be coming from a particular place where in fact the light being perceived does not originate at that place.

A FS/UWA/RO surface is referred to herein as a "free space" surface because its local spatial positions, local surface curvatures, and local surface orientations are not tied to a particular substrate, such as the x-y plane, but rather, during the surface's design, are determined using fundamental optical principles (e.g., the Fermat and Hero least time principle) applied in three dimensional space.

The FS/UWA/RO surface is referred to as an "ultra-wide angle" surface because, during use, at a minimum, it does not limit the dynamic foveal field of view of a nominal user's eye. As such, depending on the optical properties of optional optical components that may be used with the "ultra-wide angle" surface, e.g., a Fresnel lens system, the overall optical system of the HMD can be non-pupil forming, i.e., unlike conventional optical systems that have an exit pupil which limits the user's field of view, the operative pupil for various embodiments of the optical systems disclosed herein will be the entrance pupil of the user's eye as opposed to one associated with the external optical system. Concomitantly, for these embodiments, the field of view provided to the user will be much greater than conventional optical systems where even a small misalignment of the user's eye with the exit pupil of the external optical system can substantially reduce the information content available to the user and a larger misalignment can cause the entire image to disappear.

Throughout this disclosure, the following phrases/terms shall have the following meanings/scope:

(1) The phrase "a reflective optical surface" (also referred to herein as a "reflective surface") shall include surfaces that are only reflective as well as surfaces that are both reflective and transmissive. In either case, the reflectivity can be only partial, i.e., part of the incident light can be transmitted through the surface. Likewise, when the surface is both reflective and transmissive, the reflectivity and/or the transmissivity can be partial. As discussed below, a single reflective optical surface can be used for both eyes or each eye can have its own individual reflective optical surface. Other variations include using multiple reflective optical surfaces for either both eyes or individually for each eye. Mix and match combinations can also be used, e.g., a single reflective optical surface can be used for one eye and multiple reflective optical surfaces for the other eye. As a further alternative, one or multiple reflective optical surfaces can be provided for only one of the user's eyes. The claims set forth below are intended to cover these and other applications of the reflective optical surfaces disclosed herein. In particular, each claim that calls for a reflective optical surface is intended to cover head-mounted display apparatus that includes one or more reflective optical surfaces of the type specified.

(2) The phrase "an image display system having at least one light-emitting surface" is used generally to include any display system having a surface which emits light whether by transmission of light through the surface, generation of light at the surface (e.g., by an array of LEDs), reflection off of the surface of light from another source, or the like. The image display system can employ one or multiple image display devices, e.g., one or multiple LED and/or LCD arrays. As with reflective optical surfaces, a given head-mounted display apparatus can incorporate one or more image display systems for one or both of the user's eyes. Again, each of the claims set forth below that calls for an image display system is intended to cover head-mounted display apparatus that includes one or more image display systems of the type specified.

(3) The phrase "binocular viewer" means an apparatus that includes at least one separate optical element (e.g., one display device and/or one reflective optical surface) for each eye.

(4) The phrase "field of view" and its abbreviation FOV refer to the "apparent" field of view in image (eye) space as opposed to the "real" field of view in object (i.e., display) space.

SUMMARY

In accordance with an aspect, a head-mounted display apparatus comprises a frame adapted to be mounted on a user's head, an image display system supported by the frame, and a reflective optical surface supported by the frame, the reflective optical surface being a continuous surface that is not rotationally symmetric about any coordinate axis of a three-dimensional Cartesian coordinate system. The image display system includes at least one light-emitting surface. The reflective optical surface is configured to reflect spatially-separated virtual images of spatially-separated portions of the at least one light-emitting surface, at least one of the spatially-separated virtual images being angularly separated from at least one other of the spatially-separated virtual images by an angular separation of at least 100 degrees, the angular separation being measured from the center of rotation of a nominal user's eye. At least one point of the reflective optical surface is angularly separated from at least one other point of the reflective optical surface by at least 100 degrees, the angular separation being measured from the center of rotation of the nominal user's eye.

In accordance with another aspect, a head-mounted display apparatus comprises a frame adapted to be mounted on a user's head, an image display system supported by the frame and comprising at least one light-emitting surface, and a free-space, ultra-wide angle, reflective optical surface supported by the frame, configured to reflect spatially-separated virtual images of spatially-separated portions of the at least one light-emitting surface, at least one of the spatially-separated virtual images being angularly separated from at least one other of the spatially-separated virtual images by an angular separation of at least 100 degrees, the angular separation being measured from a center of rotation of a nominal user's eye.

In accordance with another aspect, a head-mounted display apparatus comprises a frame adapted to be mounted on a user's head, an image display system supported by the frame, and a reflective surface supported by the frame, the reflective surface providing a field of view to a nominal user of at least 200 degrees. The image display system includes at least one light-emitting surface which includes at least first and second, spatially-separated, light-emitting regions having, respectively, first and second information contents. The reflective surface comprises at least first and second, spatially-separated, reflective regions having, respectively, first and second surface normals which point in different directions. For at least one direction of gaze of an eye of the nominal user, light from the first light-emitting region reflects off of the first reflective region and enters said eye to form a visible virtual image of the first information content. For at least one direction of gaze of said eye, light from the second light-emitting region reflects off of the second reflective region and enters the eye to form a visible virtual image of the second information content. For at least one direction of gaze of said eye, the light from the first light-emitting region reflects off of the first reflective region and enters said eye to form the visible virtual image of the first information content and the light from the second light-emitting region reflects off of the second reflective region and does not enter said eye.

In another aspect, a computer-based method for designing a reflective optical surface for use in a head-mounted display which includes an image display system having a plurality of content areas, the method comprising using one or more computers to perform the steps of dividing, by the one or more computers, the reflective optical surface into a plurality of local reflective regions, each local reflective region having a surface normal, and associating, by the one or more computers, the each local reflective region of the reflective optical surface with a single content area of the image display system, each content area being associated with at least one local reflective region. Another step comprises adjusting, by the one or more computers, a configuration of the reflective optical surface so that each of the surface normals bisects the following two vectors: a vector from the local reflective region to its associated content area; and a vector from the local reflective region to the location of a center of rotation of a nominal user's eye.

In another aspect, a reflective optical surface comprises a surface having a plurality of local reflective regions providing non-pupil forming, in-focus for near-to-the eye viewing of spatially-separated reflected virtual images over a horizontal field of view up to 100 degrees. Each local reflective region has a surface normal such that each of the surface normals bisects both a first vector from the local reflective region to its associated content area of a display device, and a second vector from the local reflective region to the location of a center of rotation of the user's eye. Each local reflective region is configured to reflect a spatially-separated virtual image from a light-emitting surface, at least one of the spatially-separated virtual images angularly separated from at least one other of the spatially-separated virtual images by an angular separation of up to 100 degrees, the angular separation being measured from the center of rotation of the user's eye.

DETAILED DESCRIPTION

Figure 1:
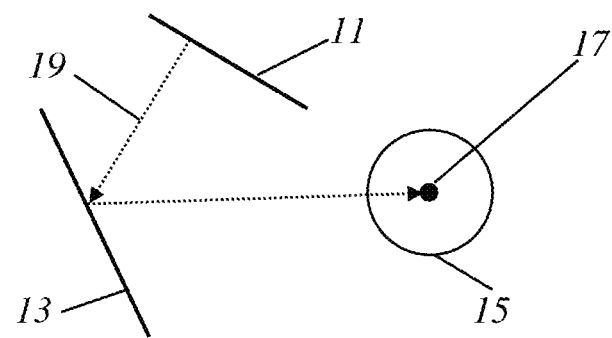
FIG. 1 is a schematic diagram showing basic components of a HMD, i.e., a display, a reflective surface, and a user's eye.

Reference will be made below in detail to embodiments, which are illustrated in the accompanying drawings. Wherever possible, the same reference numerals used throughout the drawings refer to the same or like parts. The accompanying drawings are included to provide a further understanding of the invention, and are incorporated in and constitute a part of this specification. It is to be understood that the various features of the embodiments disclosed in this specification and in the drawings can be used in any and all combinations.

Figure 2:
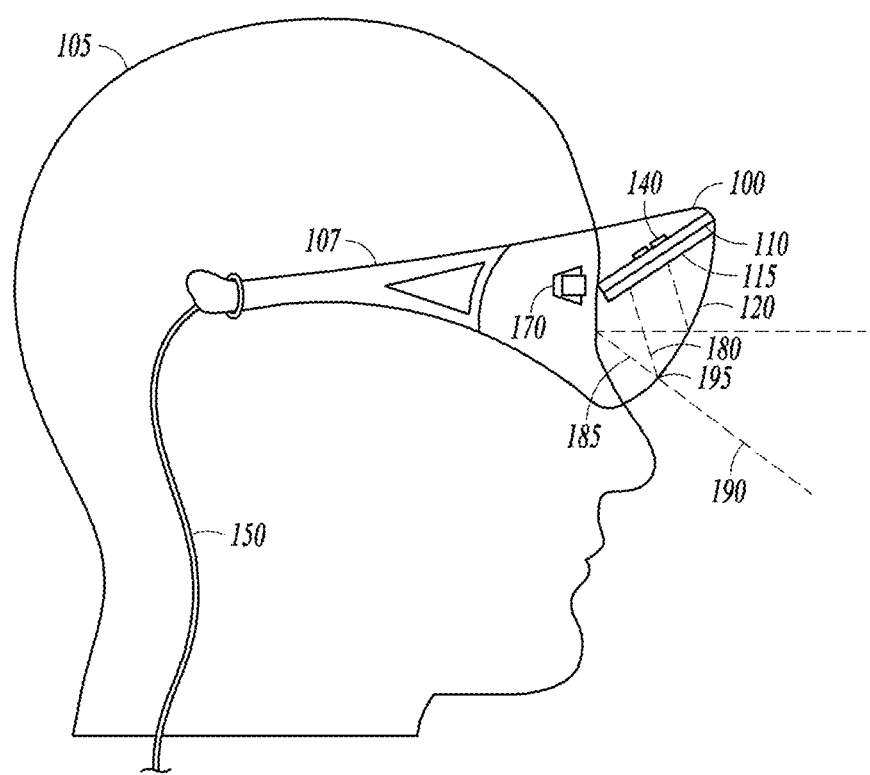
FIG. 2 is a side view representation of a head-mounted display apparatus according to an example embodiment.
Figure 3:
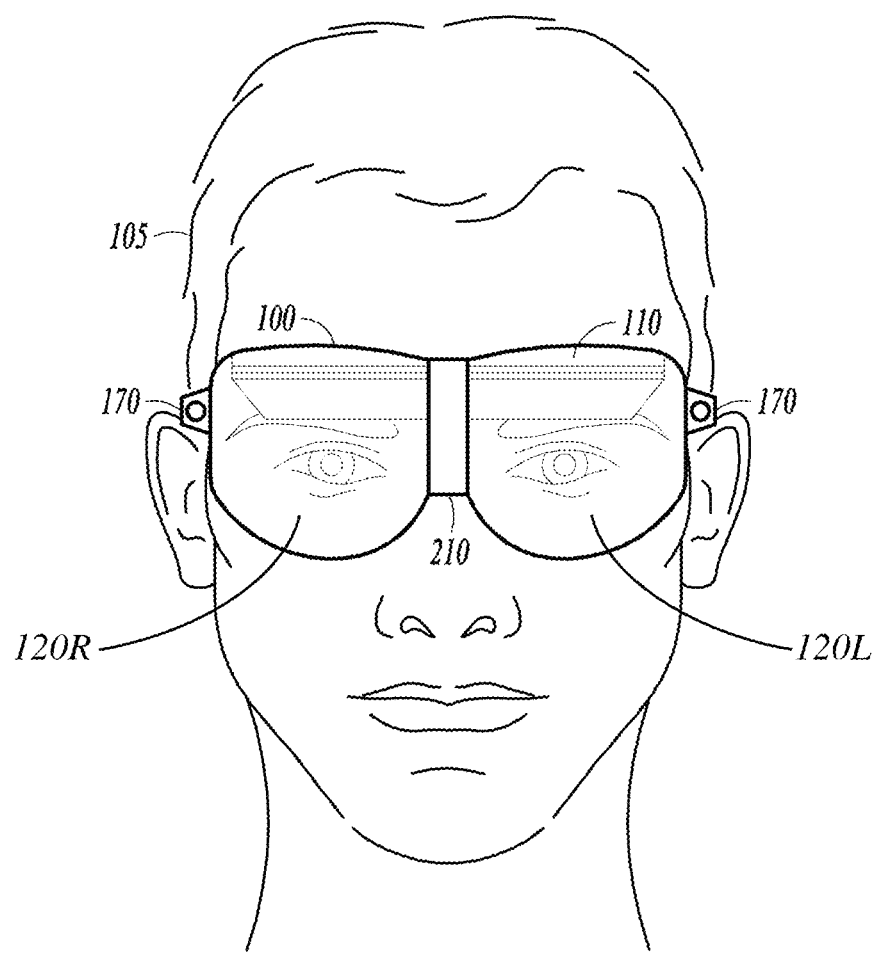
FIG. 3 is a front view representation of the head-mounted display apparatus of FIG. 2.

FIGS. 2 and 3 are, respectively, a side view and a front view of a head-mounted display apparatus 100 shown being worn by a user 105. The head-mounted display apparatus employs a FS/UWA/RO surface 120.

In one embodiment, the headed-mount display apparatus 100 can be, for example, an optical see-through, augmented reality, binocular viewer. Because an optical see-through, augmented reality, binocular viewer is typically the most complex form of a HMD, the present disclosure will primarily discuss embodiments of this type, it being understood that the principles discussed herein are equally applicable to optical see-through, augmented reality, monocular viewers, video see-through, augmented reality, binocular and monocular viewers, and binocular and monocular "virtual reality" systems.

As shown in FIGS. 2 and 3, the head-mounted display apparatus 100 includes a frame 107 adapted to be worn by the user and supported by the user's nose and ears in a manner similar to that in which eyeglasses are worn. In the embodiment of FIGS. 2-3, as well as in the other embodiments disclosed herein, the head-mounted display apparatus may have a variety of configurations and can, for example, resemble conventional goggles, glasses, helmets, and the like. In some embodiments, a strap may be used to hold the HMD's frame in a fixed position with respect to the eyes of the user. In general terms, the outside surface of the HMD package can assume any form that holds the optical system in the required orientation with respect to the HMD's display(s) and the user's eyes.

The head-mounted display apparatus 100 includes at least one image display system 110 and at least one optical system that includes a reflective optical surface which, as shown in FIGS. 2 and 3, is free space, ultra-wide angle, reflective optical surface 120, i.e., FS/UWA/RO surface 120, which by necessity is curved. In some embodiments, the FS/UWA/RO surface can be the entire optical system. Surface 120 can be purely reflective or can have both reflective and transmissive properties, in which case, it can be thought of as a type of "beam splitter." In one embodiment, the frame 107 supports the image display system 110 at a fixed location which during use of the HMD, is outside of the user's field of view. Additionally, as disclosed herein, the reflective optical surface 120 may not be rationally symmetric (is not a surface of revolution) about axes of a three-dimensional Cartesian coordinate system (x, y, or z), thus having an arbitrary origin.

Figure 6:
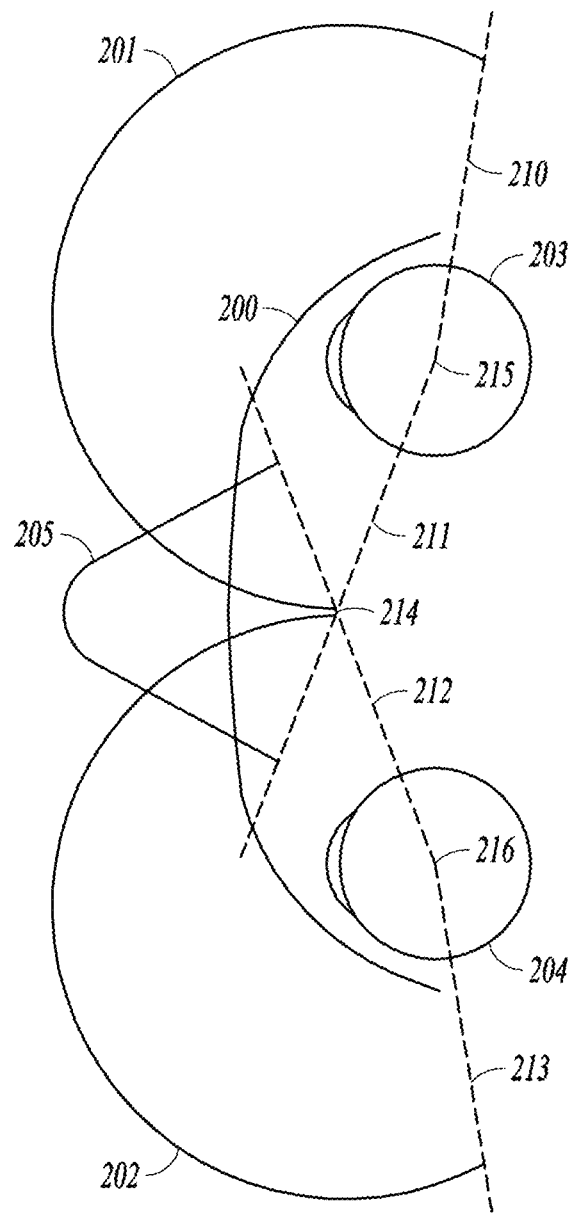
FIG. 6 is a top view of a head-mounted display apparatus illustrating the use of two curved reflective optical surfaces corresponding to the two eyes of a user according to an example embodiment.

The FS/UWA/RO surface 120 may completely surround one or both eyes, as well as the at least one image display system 110. In particular, the surface can curve around the sides of the eyes and toward the sides of the face so as to expand the available horizontal field of view. In one embodiment, the FS/UWA/RO surface 120 may extend up to 180° or more (e.g., more than 200°), as best seen in FIG. 6 discussed below. As illustrated in FIG. 3, the HMD may include two separate FS/UWA/RO surfaces 120R and 120L for the user's two eyes which are separately supported by the frame and/or a nasal ridge piece 210 (see below). Alternately, the HMD may employ a single FS/UWA/RO surface that serves both eyes with a single structure, some portions of which are viewed by both eyes and other portions of which are viewed by only one eye.

As noted immediately above and as illustrated in FIG. 3, the head-mounted display apparatus 100 can include a nasal ridge piece 210. The nasal ridge piece can be a vertical bar or wall which provides a separation between two FS/UWA/RO surfaces, one for each of the user's eye. The nasal ridge piece 210 can also provide a separation between the fields of view of the user's two eyes. In this way, the user's right eye can be shown a first representation of three dimensional physical reality in the environment by displaying a first image to the right eye via a first image display device and a first FS/UWA/RO surface, while the user's left eye is shown a second representation of three dimensional physical reality in the environment by displaying a second image to the left eye via a second image display device and a second FS/UWA/RO surface. A separate display device/reflective surface combination thus services each eye of the user, with each eye seeing the correct image for its location relative to the three dimensional physical reality in the environment. By separating the user's two eyes, the ridge piece 210 allows the image applied to each eye to be optimized independently of the other eye. In one embodiment, the nasal ridge piece's vertical wall may include two reflectors, one on each side, to allow the user to see imagery as he/she turns his/her eyes nasally, either to the left or to the right.

The at least one image display system 110 can be mounted inside the FS/UWA/RO surface 120 and may be horizontally disposed or at a slight angle with respect to the horizon. Alternatively, the at least one image display system can be located just outside of the FS/UWA/RO surface. The tilt or angle of the at least one image display system 110 or, more particularly, its at least one light-emitting surface, will in general be a function of the location of the pixels, images, and/or pieces of display information that are to be reflected from the surface 120.

In certain embodiments, the head-mounted display apparatus 100 is configured to create an interior cavity, with the FS/UWA/RO surface being reflective inward into the cavity. For a FS/UWA/RO surface having transmissive properties, the image or display information from the at least one image display system is reflected into the cavity and to the user's eye from the surface while, simultaneously, light also enters the cavity and the user's eye from the external world by passing through the reflective surface.

As discussed in detail below, in certain embodiments, the at least one image display system 110 provides images and/or pieces of display information that prior to entering the user's eye(s) are adjusted for near viewing. In some embodiments, an optional lens or lens system 115 may contribute to this adjusting. Commonly-assigned and co-pending U.S. patent application Ser. No. 13/211,365, filed Aug. 17, 2011, in the names of D. Smith, G. Wiese, G. Cuddihy, and G. Harrison, entitled "Head-Mounted Display Apparatus Employing One or More Fresnel Lenses," the contents of which are incorporated herein by reference, describes the use of one or more Fresnel lenses for this purpose. Other embodiments do not utilize the optional lens or lens system, and instead rely on the FS/UWA/RO surface to provide desired optical properties for in-focus, near-to-the-eye viewing of the images formed by the display system.

The head-mounted display apparatus can include an electronics package 140 to control the images that are displayed by the at least one image display system 110. In one embodiment, the electronics package 140 includes accelerometers and gyroscopes that provide location, orientation and position information needed to synchronize images from the at least one image display projection system 110 with user activities. Power and video to and from the head-mounted display apparatus 100 can be provided through a transmission cable 150 coupled to the electronics package 140 or through a wireless medium.

A set of cameras 170 may be situated on opposite sides of the head-mounted display apparatus 100 to provide input to the electronics package to help control the computer generation of, for example, "augmented reality" scenes. The set of cameras 170 may be coupled to the electronics package 140 to receive power and control signals and to provide video input to the electronics package's software.

The image display system used in the head-mounted display apparatus can take many forms, now known or subsequently developed. For example, the system can employ small high resolution liquid crystal displays (LCDs), light emitting diode (LED) displays, and/or organic light emitting diode (OLED) displays, including flexible OLED screens. In particular, the image display system can employ a high-definition small-form-factor display device with high pixel density, examples of which may be found in the cell phone industry. A fiber-optic bundle can also be used in the image display system. In various embodiments, the image display system can be thought of as functioning as a small screen television. If the image display system produces polarized light (e.g., in the case where the image display system employs a liquid crystal display where all colors are linearly polarized in the same direction), and if the FS/UWA/RO surface is polarized orthogonally to the light emitted by the display, then light will not leak out of the FS/UWA/RO surface. The information displayed and the light source itself will accordingly not be visible outside of the HMD.

Overall operation of an exemplary embodiment of an optical system constructed in accordance with the present disclosure, specifically, an optical system for an "augmented reality" HMD, is illustrated by the ray-tracings of FIG. 2, specifically, light rays 180, 185, and 190. In this embodiment, FS/UWA/RO surface 120 has both reflective and transmissive properties. Using surface 120's transmissive properties, light ray 190 enters from the environment through the surface and proceeds towards the user's eye. From the same region of surface 120, light ray 180 is reflected by the surface (using the surface's reflective properties) and joins light ray 190 to create combined light ray 185 that enters the user's eye when the user looks in the direction of point 195, i.e., when the user's direction of gaze is in the direction of point 195. While so looking, the user's peripheral vision capabilities allow the user to see light from other points in the environment which pass through surface 120, again using the surface's transmissive properties.

Figure 4:
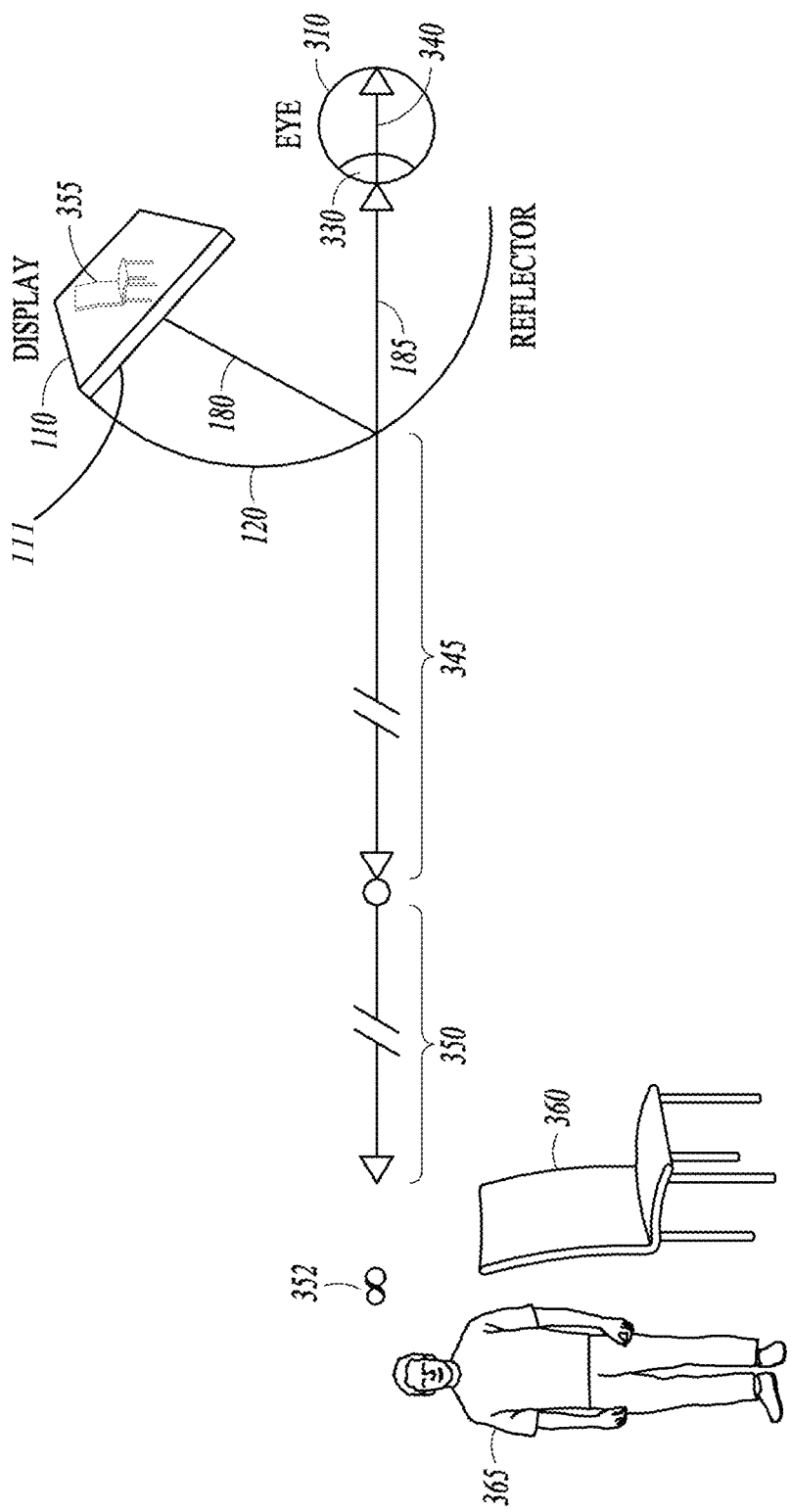
FIG. 4 is a ray diagram illustrating light paths in a head-mounted display apparatus from both a display and an external object according to an example embodiment.

FIG. 4 is a further ray-trace drawing illustrating the operation of an exemplary embodiment of the head-mounted display apparatus 100 disclosed herein. In this embodiment, the overall vision system includes three parts: (1) the at least one image display system 110, (2) FS/UWA/RO surface 120, and (3) the user's eye 310. The eye 310 is represented with an internal lens 330. The light emitted from a pixel of the at least one image display system 110 is represented by ray 180, as in FIG. 2. This light will appear at a point on the retina of the user's eye after being reflected by surface 120 provided the user's direction of gaze and associated field of view (see the discussion of FIGS. 7 and 8 below) include the point at which ray 180 strikes surface 120. More particularly, as discussed below, due to the optical properties involving the normal that bisects the vectors to the eye and to the pixel from the point on the FS/UWA/RO surface, the pixel will only appear at point 195; that is, even though light radiates from the pixel in a wider cone, the FS/UWA/RO surface is engineered to only let the light come from one location.

In FIG. 4, it is assumed that the user's direction of gaze is towards the point of intersection of ray 180 with surface 120, as illustrated by light rays 185 and 340. What the eye sees, however, is a virtual image that appears in the space ahead of it, at a distance represented by vectors 345 and 350, e.g., at infinity as shown by reference number 352. In FIG. 4, a chair is used for purposes of illustration, with the at least one image display system 110 producing a real image 355 of the chair which becomes virtual image 360 after reflection of the light emitted from the display system by FS/UWA/RO surface 120. In an "augmented reality" environment, the optical system, including the FS/UWA/RO surface, could, for example, cause the virtual image 360 of the chair to appear to be at the same location as a person 365 actually in the physical environment. Note that ray 345, which stops at a distance closer than infinity, is included in FIG. 4 to show that the image can be made to optically appear at any distance between nearby and infinity. For instance, the person could be standing at 50 meters away, and that is where the chair would be placed.

Figure 5:
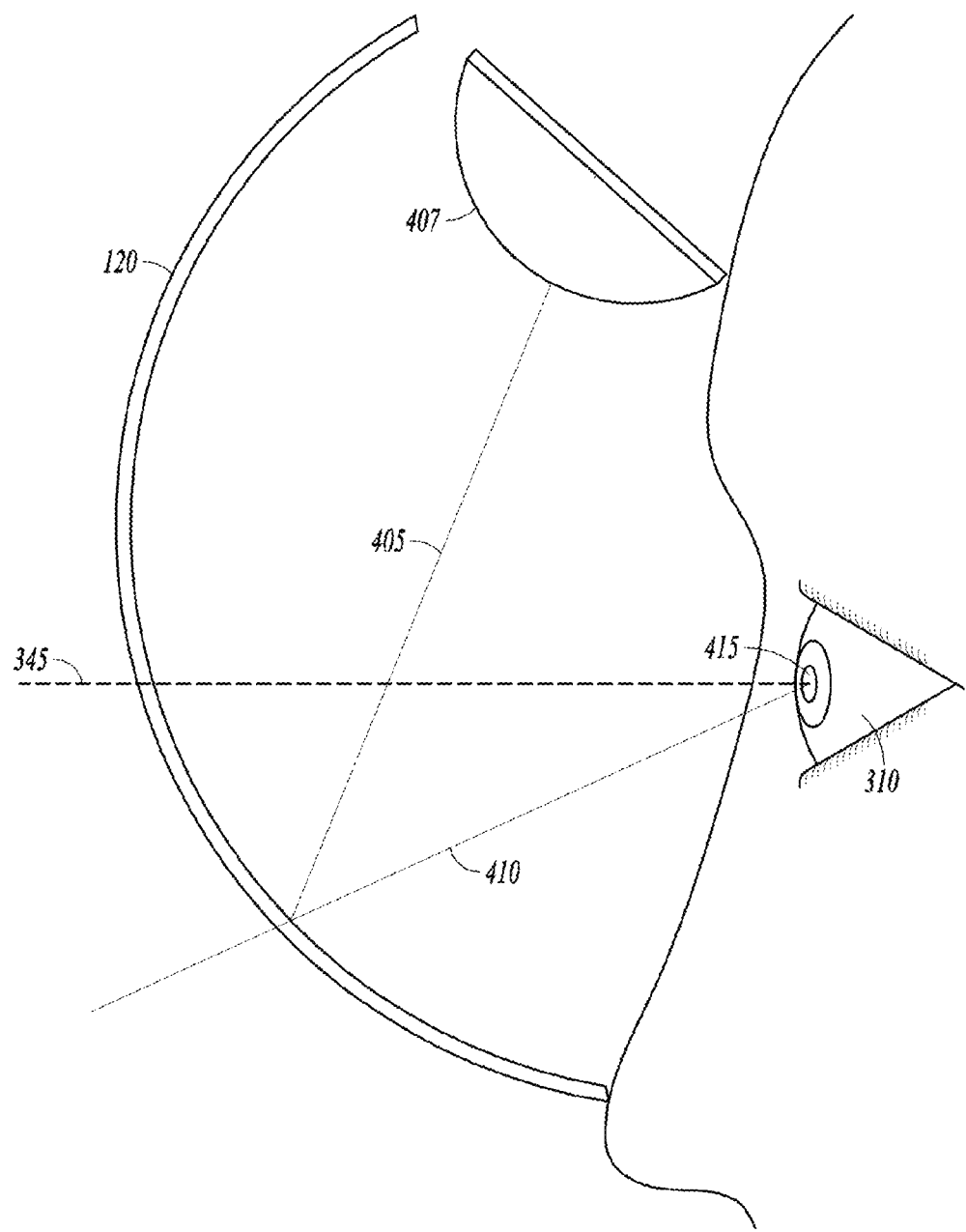
FIG. 5 is a ray diagram illustrating an example embodiment employing a curved display and a curved reflector.

In FIGS. 1-4, the at least one image display system is shown as having a planar light-emitting surface (e.g., surface 111 in FIG. 4). The display system may also have a curved light-emitting surface. Such an embodiment is shown in FIG. 5, where a light ray 405 emanates from a curved display screen 407 (curved light-emitting surface). This ray reflects from FS/UWA/RO surface 120 and enters the pupil 415 of the user's eye 310 (see ray 410). In this embodiment, surface 120 also admits light represented by ray 345 from the external environment, thus allowing display-generated images to overlay external images. Note that for purposes of illustration, ray 345 is shown displaced from ray 410; for a pure overlay of the external image, ray 345 will overlay ray 410.

As discussed above, prior optical systems used in HMDs that have employed reflective optical surfaces have been pupil forming and thus have had limited viewing areas, a typical field of view being ~60 degrees or less. This has greatly limited the value and capability of prior head-mounted display apparatuses. In various embodiments, the head-mounted displays disclosed herein have much wider fields of view (FOV), thus allowing much more optical information to be provided to the user compared to HMDs having smaller fields of view. The wide field of view can be greater than 100°, greater than 150°, or greater than 200°. In addition to providing more information, the wide field of view allows the additional information may be processed by the user in a more natural manner, enabling better immersive and augmented reality experiences through a better match of the displayed images to physical reality.

Specifically, in the exemplary embodiment illustrated in FIG. 6, for a straight ahead direction of gaze, the eye is able to take in a whole viewing area represented in FIG. 6 by curved FS/UWA/RO surfaces 201 and 202, corresponding to at least 150 degrees of horizontal field of view (FOV) for each eye (e.g., ~168 degrees of horizontal FOV). This field of view is composed of the eye's foveal field of view and its peripheral field of view. In addition, the eye is allowed to move freely about its center of rotation to aim the combined foveal+peripheral field of view in different directions of gaze, as the eye naturally does when viewing the physical world. The optical systems disclosed herein thus allow the eye to obtain information throughout a range of motion in the same manner as the eye does when viewing the natural world.

Examining FIG. 6 in more detail, this figure is a simplified line representation of the front of a user's head 200 as seen from the top. It shows FS/UWA/RO surfaces 201 and 202 placed in front of the user's eyes 203 and 204. As discussed above, the FS/UWA/RO surfaces 201 and 202 may rest upon the user's nose 205 where they come together at the center front 214 of the user's head 200. As discussed in detail below, the local normals and local spatial locations of surfaces 201 and 202 are adjusted so that images produced by the at least one image display system (not shown in FIG. 6) cover at least 100°, e.g., in certain embodiments, at least 150° and, in other embodiments, at least 200°, of horizontal FOV for each eye. (Optionally, as also discussed below, the local radii of curvature are also adjusted to provide, when combined with a Fresnel lens system, distant virtual images.) For example, the local normals and local spatial locations can be adjusted to cover the user's complete ~168 degree, straight ahead, horizontal, static field of view for each eye, with the 168 degrees extending from edge-to-edge of the FS/UWA/RO surfaces 201 or 202, as shown by sight lines 210,211 and 212,213. The sight lines thus correspond to the wide static field of view (foveal+peripheral) that is provided to the user. In addition, the user is free to move his/her eyes around rolling centers 215 and 216 while continuing to see computer-generated imagery.

Figure 12:
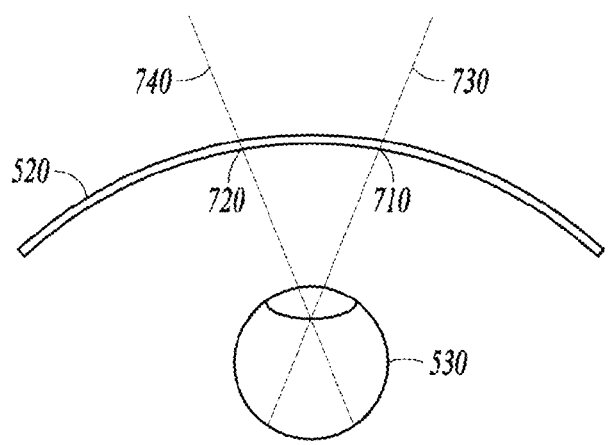
FIG. 12 is a representation of a curved reflector along with light paths according to an example embodiment.

In FIG. 6, as well as in FIGS. 4, 5, and 12, the FS/UWA/RO surfaces are shown as parts of spheres for ease of presentation. In practice, the surfaces are not spheres, but have more complex configurations so that their local normals and local spatial locations (and, optionally, local radii of curvature) will provide the desired static and dynamic field of view (and, optionally, desired distances to the virtual images). Also, in FIG. 6, the right side of the head-mounted display apparatus operates identically to left side, it being understood that the two sides can differ if desired for particular applications.

Figure 7:
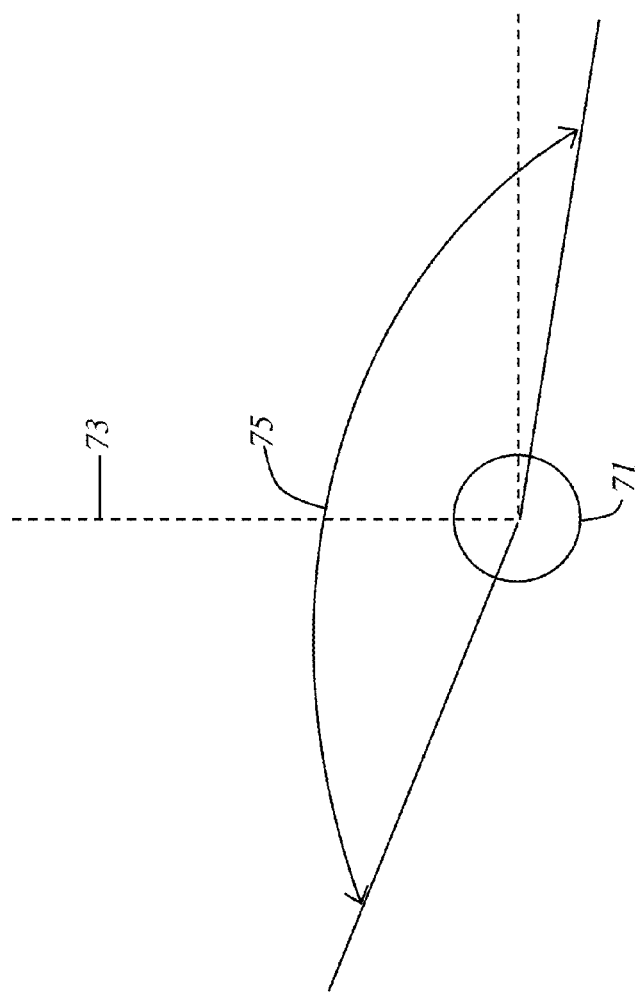
FIG. 7 is a schematic diagram illustrating a static field of view of a nominal human eye for a straight ahead direction of gaze.
Figure 8:
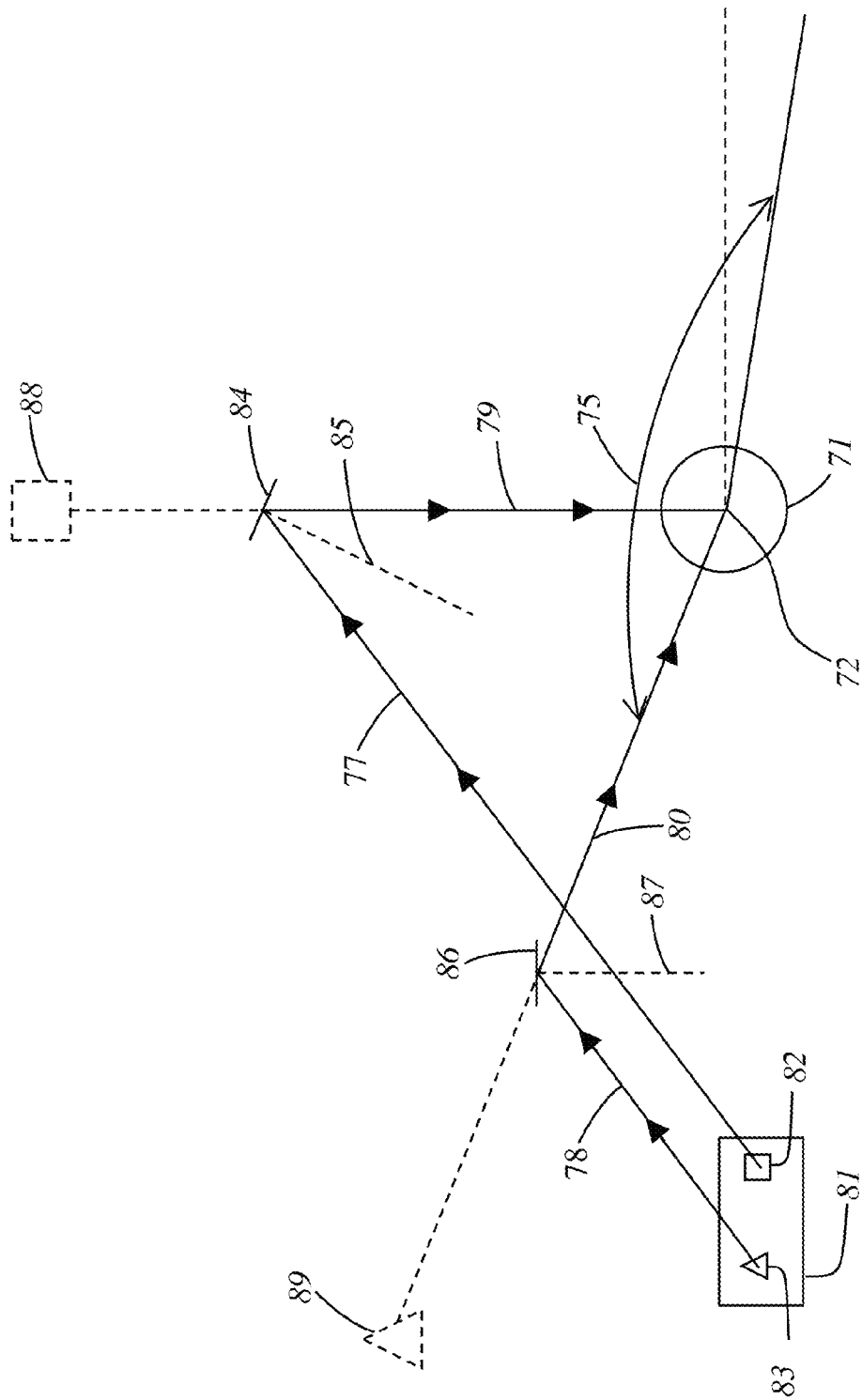
FIG. 8 is a schematic diagram illustrating the interaction between the static field of view of FIG. 7 with a FS/UWA/RO surface according to an example embodiment. The arrows in FIG. 8 illustrate directions of light propagation.

FIGS. 7 and 8 further illustrate the static and dynamic fields of view provided by the FS/UWA/RO surfaces disclosed herein. FIG. 7 shows a user's nominal right eye 71 having a straight ahead direction of gaze 73. The eye's foveal+peripheral field of view is shown by arc 75, which has an angular extent of ~168°. Note that for ease of presentation, in FIGS. 6-8, the field of view is shown relative to the center of rotation of the user's eye as opposed to the center or edges of the user's pupil. In fact, the large field of view (e.g., ~168°) achieved by a human eye is a result of the large angular extent of the retina which allows highly oblique rays to enter the user's pupil and reach the retina.

FIG. 8 schematically shows the interaction of the field of view of FIG. 7 with a HMD having: (a) an image display system whose at least one light-emitting surface 81 has a first light-emitting region 82 (illustrated as a square) and a second light-emitting region 83 (illustrated as a triangle) and (b) a FS/UWA/RO surface having a first reflective region 84 which has a first local normal 85 and a second reflective region 86 which has a second local normal 87.

As indicated above, the FS/UWA/RO surface is both a "free space" surface and an "ultra-wide angle" surface. In addition, as noted above and discussed in more detail below, the surface can participate in (or be the sole source of) collimation (or partial collimation) of the light that enters the user's eye. Such collimation causes the virtual image produced by the FS/UWA/RO surface to appear to be located a long distance from the user, e.g., 30 meters or more, which permits the user to easily focus on the virtual image with a relaxed eye.

The "free space" and "ultra-wide angle" aspects of the FS/UWA/RO surface can be achieved by adjusting the local normals of the surface so that the user's eye sees light-emitting regions of the at least one image display system as coming from predetermined regions of the FS/UWA/RO surface (predetermined locations on the surface).

For example, in FIG. 8, the designer of the HMD might decide that it would be advantageous for a virtual image 88 of the square to be viewed by the center portion of the user's retina when the user's direction of gaze is straight ahead and for a virtual image 89 of the triangle to be viewed by the center portion of the user's retina when the direction of gaze is, for example, ~50° to the left of straight ahead. The designer would then configure the at least one image display system, the FS/UWA/RO surface, and any other optical components of the system (e.g., one or more Fresnel lenses between the image display system and the FS/UWA/RO surface) so that the virtual image of the square would be straight ahead and the virtual image of the triangle would be 50° to the left of straight ahead during use of the HMD.

In this way, when the user's direction of gaze (line of sight) intersected the FS/UWA/RO surface straight on, the virtual image of the square would be visible at the center of the user's eye as desired, and when the user's direction of gaze (line of sight) intersected the FS/UWA/RO surface at 50 degrees to the left of straight ahead, the virtual image of the triangle would be visible at the center of the user's eye, as also desired. Although not illustrated in FIGS. 7 and 8, the same approaches are used for the vertical field of view, as well as for off-axis fields of view. More generally, in designing the HMD and each of its optical components, the designer "maps" the at least one light-emitting surface of the display to the reflective surface so that desired portions of the display are visible to the user's eye when the eye's gaze is in particular directions.

Thus, as the eye scans across the field of view, both horizontally and vertically, the FS/UWA/RO surface shines different portions of the at least one light-emitting surface of the image display system into the user's eye. Although the foregoing discussion has been in terms of the center of a nominal user's retina, the design process can, of course, use the location of a nominal user's fovea instead, if desired.

It should be noted that in FIG. 8, any rotation of the user's eye to right causes the virtual image 89 of the triangle to no longer be visible to the user. Thus, in FIG. 8, any direction of gaze that is straight ahead or to the left of straight ahead provides the user with virtual images of both the square and the triangle, while a direction of gaze to the right of straight ahead provides a virtual image of only the square. The acuity of the virtual images will, of course, depend on whether the virtual images are perceived by the user's foveal vision or the user's peripheral vision.

If the designer of the HMD had placed the virtual image of the square far to the right in FIG. 8 while leaving the virtual image of the triangle far to the left, there would be directions of gaze where only the virtual image of the square was visible and other directions of gaze where only the virtual image of the triangle was visible. Likewise, based on the principles disclosed herein, the designer could arrange the virtual image of the square and the virtual image of the triangle so that the virtual image of the triangle was always visible, with the virtual image of the square being visible for some directions of gaze, but not for others. As a further variation, the designer of the HMD could place the virtual image of the square and triangle at locations where for one or more directions of gaze, neither image was visible to the user, e.g., the designer could place the virtual images just outside the user's static field of view for a straight ahead direction of gaze. The flexibility provided to the HMD designer by the present disclosure is thus readily apparent.

In one embodiment, the "free space" and the "ultra-wide angle" aspects of the reflective surface are achieved by using the principles of Fermat and Hero pursuant to which light travels along the shortest (least time) optical path. Commonly-assigned and co-pending U.S. patent application Ser. No. 13/211,389, filed Aug. 17, 2011, in the names of G. Harrison, D. Smith, and G. Wiese, entitled "Methods and Systems for Creating Free Space Reflective Optical Surfaces," the contents of which are incorporated herein by reference, describes an embodiment in which the Fermat and Hero principles are used to design FS/UWA/RO surfaces suitable for use in HMDs.

In various embodiments, the HMD apparatus may provide the user with a full foveal dynamic field of view, a full foveal+ peripheral static field of view, or a full foveal+peripheral dynamic field of view.

Additionally, in various embodiments, the HMD apparatus may be a binocular non-pupil-forming system in which the eye is free to move about its rolling center throughout its normally obtainable angular extents without being constrained to look through an external pupil. Prior HMD devices have alleged that they have or can provide a wide field of view, but these devices have included an external pupil that the eye must look through. Although there is a wide amount of information provided to the eye, if the eye turns, the information is gone. This is the fundamental problem with pupil-forming systems which is avoided in embodiments of the present disclosure which employ reflective surfaces and, in particular, FS/UWA/RO surfaces.

Furthermore, in certain embodiments of the above aspects of the disclosure, a separate reflective surface and/or a separate image display system is used for each of the user's eyes.

In other embodiments, the reflective optical surface, either alone or in combination with other optical components (e.g., one or more Fresnel lenses), collimates (or substantially collimates) the light from the image display system, such collimation being achieved through the surface's local radii of curvature.

By means of the Fermat and Hero least-time principles, any "desired portion" of the at least one light-emitting surface of an image display system (e.g., any pixel of an image display system) can be caused to have any desired point of reflection at the FS/UWA/RO surface, provided that the optical path from the desired portion of the at least one light-emitting surface to the point of reflection at the FS/UWA/RO surface and then to the center of rotation of the user's eye is at an extremum.

Figure 9:
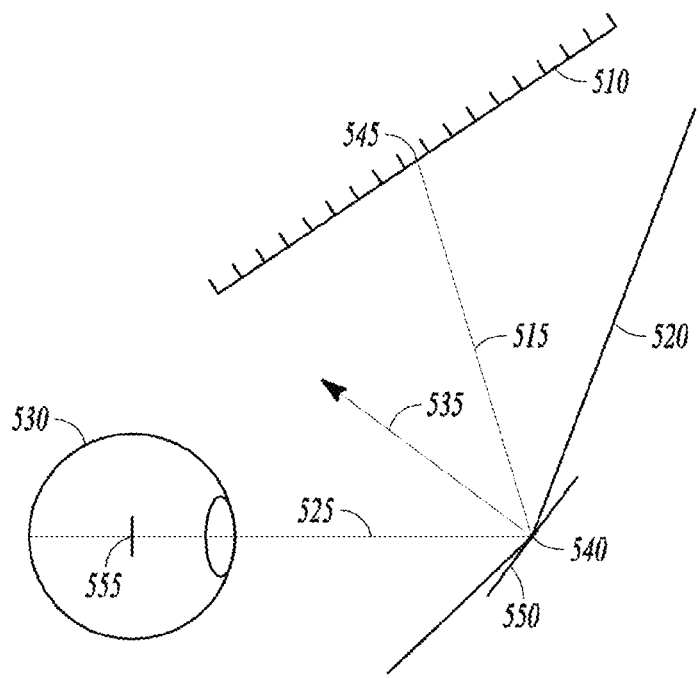
FIG. 9 is a ray diagram illustrating a light path from a given pixel on a display as it is reflected toward an eye according to an example embodiment.
Figure 10:
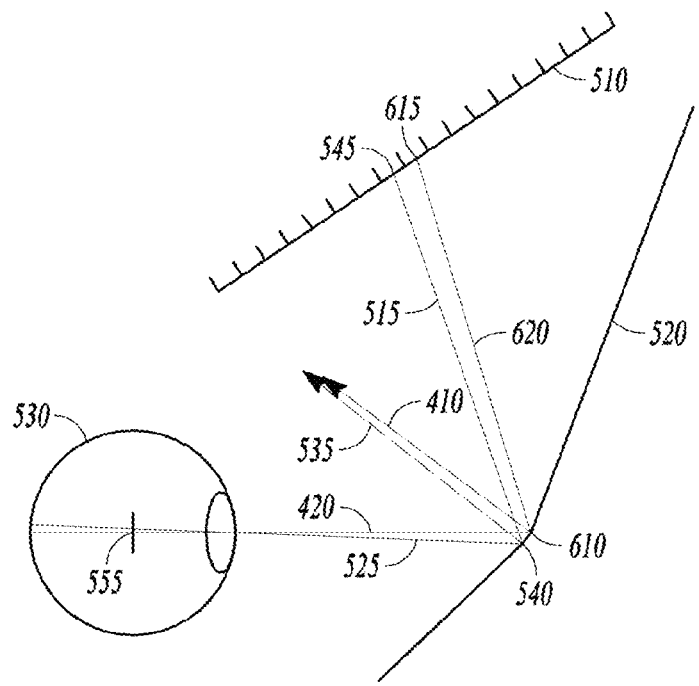
FIG. 10 is a ray diagram illustrating light paths from two pixels on a display as they are reflected toward an eye according to an example embodiment.

An extremum in the optical path means that the first derivative of the optical path length has reached a zero value, signifying a maximum or a minimum in the optical path length. An extremum can be inserted at any point in the field of view by creating a local region of the reflective optical surface whose normal bisects (a) a vector from the local region to the user's eye (e.g., a vector from the center of the local region to the center of the user's eye) and (b) a vector from the local region to the "desired portion" of the light-emitting surface (e.g., a vector from the center of the local region to the center of the "desired portion" of the light-emitting surface). FIGS. 9 and 10 illustrate the process for the case where the "desired portion" of the at least one light-emitting surface of the image display system is a pixel.

Specifically, FIG. 9 shows a light-emitting surface 510 of an image display system composed of a generally rectangular array of pixels that are emanating light toward the front of a head-mounted display apparatus in the direction of light beam 515. Light beam 515 bounces off of reflective optical surface 520, which for ease of presentation is shown as a flat in FIG. 8. Upon reflection, light beam 515 becomes light beam 525 that enters the user's eye 530.

For the purposes of determining the surface normal of the reflector for each pixel, it is only necessary to determine the three-dimensional bisector of vectors corresponding to light beams 515 and 525. In FIG. 9, this bisector vector is shown in two-dimensional form as line 535. Bisecting vector 535 is normal to the reflective optical surface at point of reflection 540, which is the location on surface 520 where pixel 545 of light-emitting surface 510 will be visible to the user of the HMD.

Specifically, in operation, pixel 545 in the display surface 510 emits light beam 515 that bounces off reflective optical surface 520 at an angle established by the surface normal corresponding to bisecting vector 535 and its perpendicular plane 550, yielding by the Fermat and Hero principles, a reflected pixel at point of reflection 540 that is seen by the eye 530 along light beam 525. In order to accurately calculate the surface normal at the point of reflection 540, the beam 525 can pass through approximately the center 555 of the user's eye 530. The results will remain approximately stable even if the user's eye rotates, becoming peripheral vision until, as discussed above in connection with FIGS. 7 and 8, the eye turns so much that that region of the display cannot be seen with either the user's foveal or peripheral vision.

To calculate the position of the surface normal, the use of the method of quaternions may be employed, where q1=orientation of beam 515 q2=orientation of beam 525 and q3=the orientation of the desired surface normal 535=(q1+q2)/2

Figure 11:
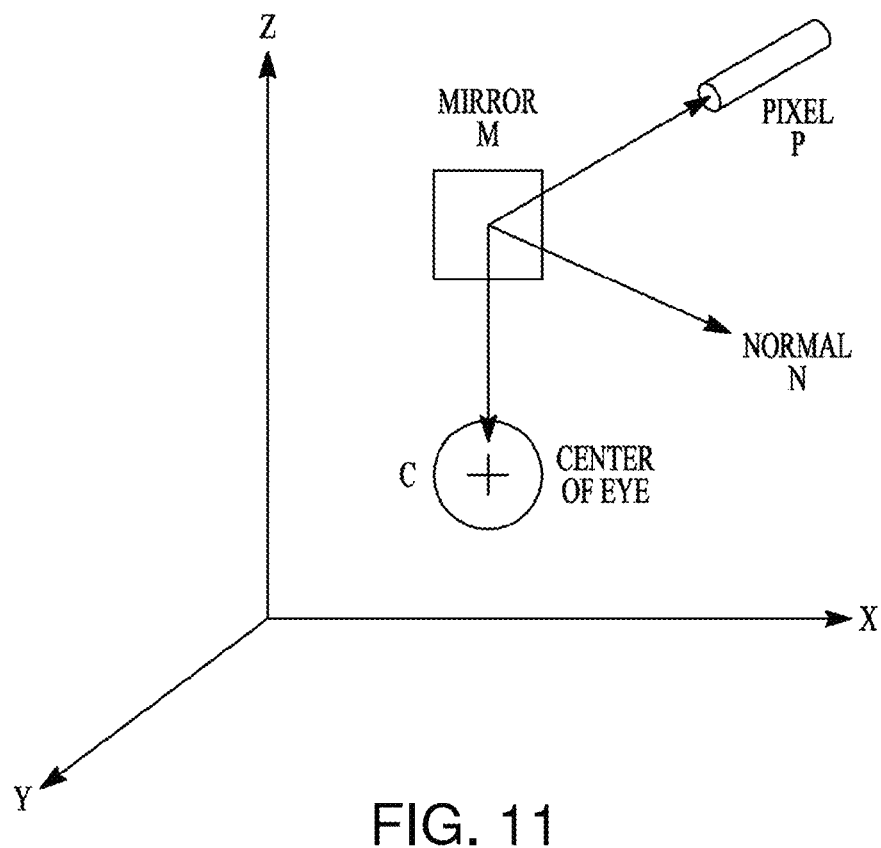
FIG. 11 is a diagram illustrating variables used in selecting the direction of the local normal of a reflector according to an example embodiment.

The surface normal may also be described in vector notation, as illustrated in FIG. 11. In the following equation and in FIG. 11, point N is one unit away from the point M at the center of the region of interest of the reflective optical surface and is in the direction of the perpendicular normal to the tangent plane of the reflective optical surface at the point M. The tangent plane of the reflective optical surface at point M is controlled to satisfy the relation expressed in the following equation such that in three-dimensional space, the surface normal at the point M bisects the line from the point M to the point P at the center of the pixel of interest and the line from point M to the point C at the rolling center of the user's eye (for reference, point C is approximately 13 mm back from the front of the eye).

The equation describing the point N on the surface normal at point M is:

$$N = \frac{(P-M)+(C-M)}{|(P-M)+(C-M)|} + M$$

where all the points, N, M, P, and C have components [x, y, z] that indicate their position in three-dimensional space in an arbitrary Cartesian coordinate system.

The resulting normal vector N-M has the Euclidean length $$|N-M|=1$$

where the two vertical bars represents the Euclidean length, calculated as follows:

$$|N-M|=\sqrt{(x_N-x_M)^2+(y_N-y_M)^2+(z_N-z_M)^2}.$$

As a numerical example, consider the following M, P, and C values:

$$M=[x_M, y_M, z_M]=[4, 8, 10]$$

$$P=[2, 10, 5]$$

$$C=[6, 10, 5]$$

The point along the normal, N, is calculated as follows:

$$P-M=[(2-4),(10-8),(5-10)]=[-2,2,-5]$$

$$C-M=[(6-4),(10-8),(5-10)]=[2, 2. -5]$$

$$(P-M)+(C-M)=[0, 4, -10]$$

and $$N = \frac{(P-M)+(C-M)}{|(P-M)+(C-M)|} + M$$

$$= \{[-2, 2, -5] + [2, 2, -5]\} / 10.7703296143 + [4, 8, 10]$$

$$= [0, 0.3713806764, -0.928476691] + [4, 8, 10]$$

$$= [4, 8.3713806764, 9.0715233091]$$

Figure 17:
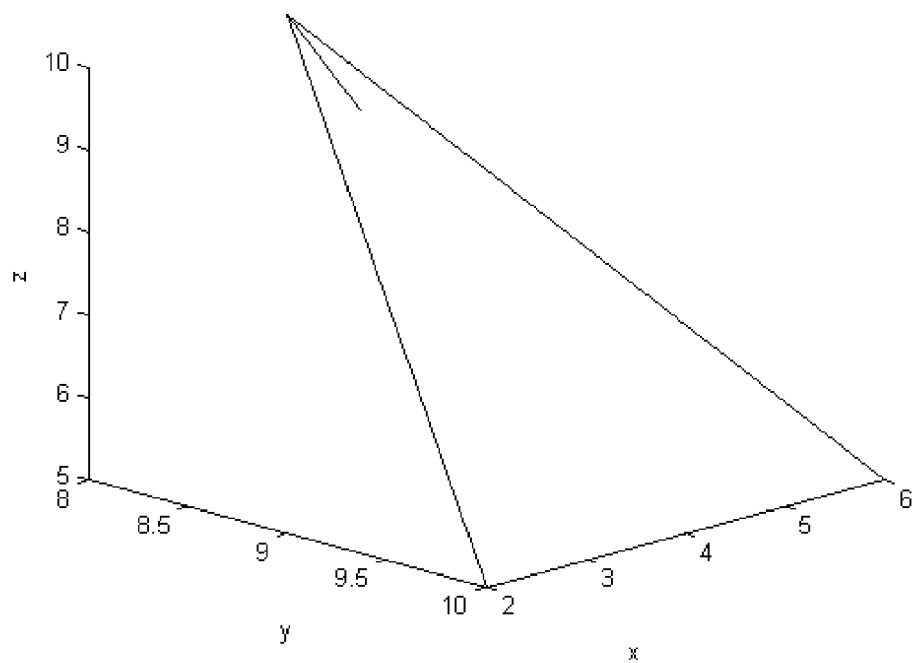
FIG. 17 is a schematic diagram illustrating geometry for calculating a local normal to a reflective surface according to an example embodiment.

The geometry is shown in FIG. 17, where the bisector is between the two longer vectors.

The foregoing is, of course, merely a representative calculation serving to show the use of the Fermat and Hero principles of least time in determining local tangent plane angular constraints for a field of points making up a free-space (free-form) surface manifold of reflecting regions intended to present a contiguous virtual image to the viewer. The only real constant is the center of the user's eye, and the eye's natural field of view. All other components may be iteratively updated until an appropriate solution for a given image display system and reflective optical surface orientation is reached. Looked at another way, the pixel image reflection locations, M1, M2, . . . , Mn, and their associated normals and curvatures may be thought of as a matrix that is "warped" (adjusted) so that the FS/UWA/RO surface achieves the desired virtual image processing of computer-generated images formed by the image display system.

In applying the Fermat and Hero principles, it should be noted that in some embodiments, it will be desirable to avoid the situation where the normals are adjusted such that the user sees the same pixel reflection at more than one point. It should also be noted that in some embodiments, the local regions of the reflective optical surface can be very small and may even correspond to a point on the reflector, with the points morphing into other points to make a smooth surface.

In order to ensure that the user can easily focus on the virtual image of the "desired portion" of the at least one light-emitting surface (e.g., the virtual image of a pixel), the radius of curvature of the region surrounding the reflection point (reflection area) is controlled so that a collimated (or near collimated) image reaches the user. The collimated (or near collimated) image has optical rays that are more parallel, as if the image had originated at a far distance from the user, tens to hundreds of meters for instance. In order to achieve such a surface, the radius of curvature of the reflection region of the reflective optical surface corresponding to the "desired portion" of the at least one light-emitting surface (desired light-emitting pixel) may be kept to a radius near to one-half the distance from the reflection region to the actual "desired portion" of the light-emitting surface (actual pixel) on the display.

Thus, in one embodiment, the inter-reflected-pixel normal vector from the pixel of concern to the adjacent pixels satisfies a relationship that allows them to establish a radius of curvature of approximately one-half the length of the vector from the location of the reflected pixel on the reflective surface to the display pixel. Adjustments that affect this parameter include the size of the at least one light emitting surface and whether the at least one light emitting surface is curved.

FIG. 10 illustrates this embodiment. In order to control the radius of curvature of the region surrounding the pixel reflection so that a collimated (or near collimated) image reaches the user, two adjacent pixel reflecting regions, such as at the point of reflection 540, are considered. More regions may be considered for better balance but two are sufficient. With reference to FIG. 10, two pixel reflective points 540 and 610 are shown with respect to two pixels, 545 and 615, respectively on display surface 510. The surface normals at points 540 and 610 are calculated along with the angle between their directions. The radius of curvature is calculated knowing these angles and the distance between the points 540 and 610. Specifically, the surface configuration and, if needed, the surface's spatial location are adjusted until the radius of curvature is equal to (or approximately equal to) one-half of the average of the lengths of beams 515 and 620. In this way, zero or near-zero diopter light can be provided to the user's eye. This is equivalent to light coming from a point essentially infinitely distant, and the light wavefront is flat, resulting in parallel surface normals to the light's wavefront.

In addition to controlling the local radii of curvature, in certain embodiments, as a first order point solution to having a collimated (or near collimated) image enter the eye, the at least one light emitting surface is nominally located a distance of one focal length away from the FS/UWA/RO surface, where the focal length is based on the average value of the radii of curvature of the various reflective regions making up the FS/UWA/RO surface.

The result of applying the Fermat and Hero principles is a set of reflective regions that may be combined into a smooth reflective surface. This surface will, in general, not be spherical or symmetric. FIG. 12 is a two dimensional representation of such a FS/UWA/RO surface 520. As discussed above, surface 520 may be constructed such that the radii of curvature at points 710 and 720 are set to values which provide for relaxed viewing of the image being reflected from the at least one light-emitting surface of the image display system which is being reflected by the surface. In this way, looking in a certain direction represented by line 730 will provide a collimated (or near collimated) virtual image to the eye 530, as will looking in a different direction represented by line 740. To enable a smooth transition of viewing all across the field of view, the regions of the FS/UWA/RO surface may be smoothly transitioned from one control point to another, as may be performed by using Non-Uniform Rational B-Spline (NURBS) technology for splined surfaces, thus creating a smooth transition across the reflective surface. In some cases, the FS/UWA/RO surface may include a sufficient number of regions so that the surface becomes smooth at a fine grain level. In some embodiments, different magnifications for each portion of the display (e.g., each pixel) may be provided using a gradual gradient to allow better manufacturability, realization, and image quality.

Figure 13:
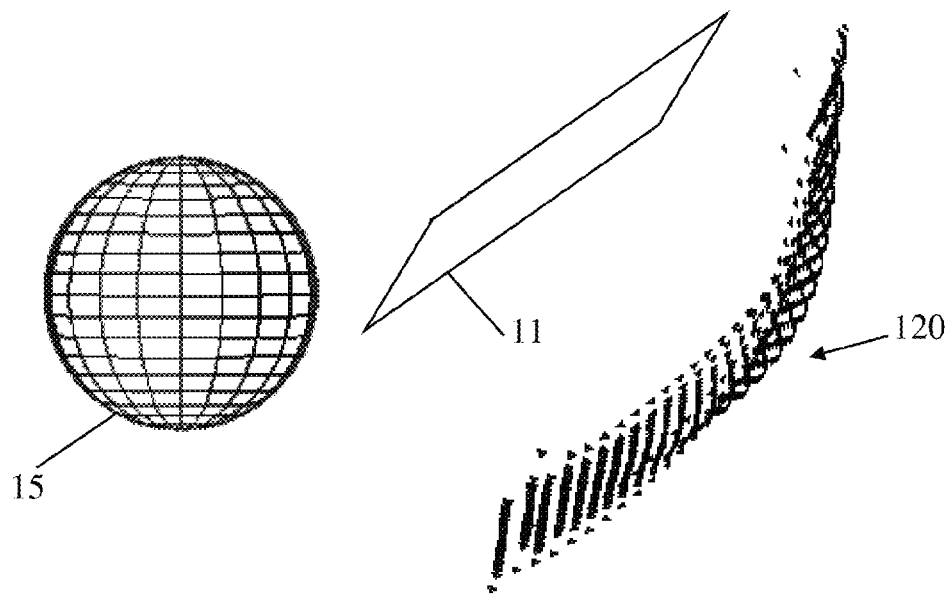
FIGS. 13 and 14 illustrate, from two perspectives, a FS/UWA/RO surface according to an example embodiment.
Figure 14:
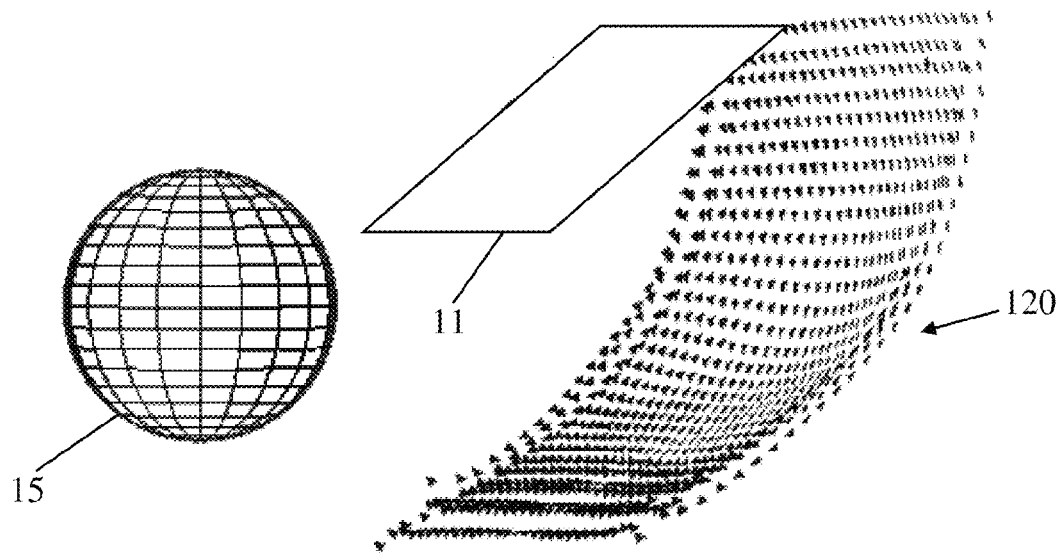
Figure 15:
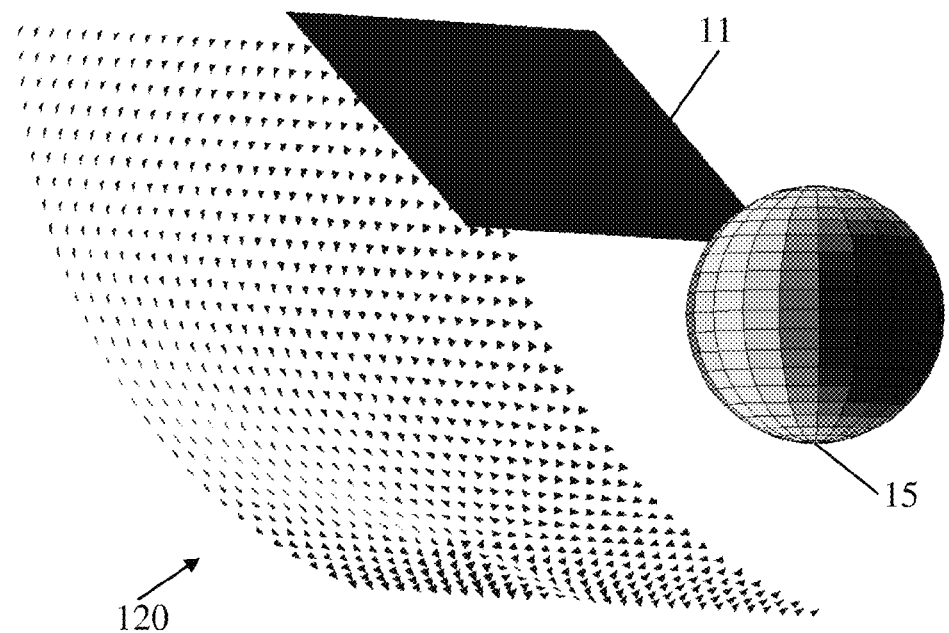
FIGS. 15 and 16 illustrate, from two perspectives, another FS/UWA/RO surface according to an example embodiment.
Figure 16:
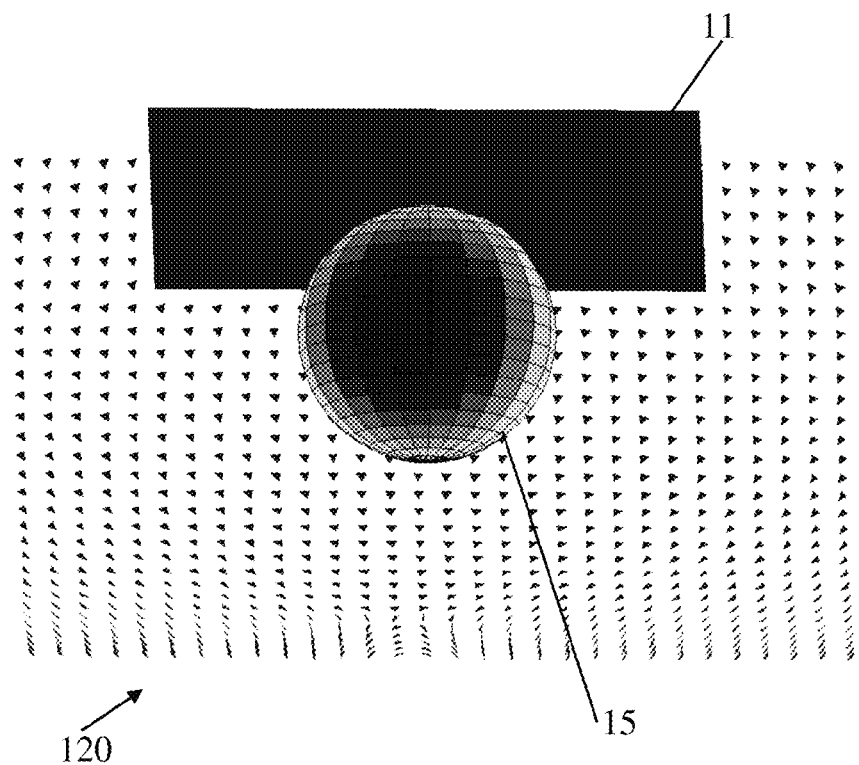

FIGS. 13 and 14 show a FS/UWA/RO surface created using the above techniques from two different perspectives. FIGS. 15 and 16 show a further refined version of the reflective surface of FIGS. 13 and 14, again from two perspectives. The FS/UWA/RO surfaces of these figures were designed using the computer-based techniques of the commonly-assigned and co-pending application entitled "Methods and Systems for Creating Free Space Reflective Optical Surfaces," referred to above.

From the foregoing, it can be seen that methods for designing head-mounted displays have been disclosed which in exemplary embodiments can include: determining a desired field of view, choosing a display surface size (e.g., width and height dimensions), choosing an orientation for the display surface relative to a reflective surface, cataloging the position of every pixel on the display surface, and choosing a location for display of every pixel from the display surface on the reflective surface. The display surface can be placed above the eye and tilted toward the reflective surface, allowing the curvature of the reflective surface to reflect light to the eye of the wearer. In further embodiments, the display surface may be placed in other positions, such as to the side of the eye or below the eye, with the reflective position and curvature selected to reflect the light from the display surface appropriately, or being tilted to a different degree.

In certain embodiments, a three-dimensional instantiation or mathematical representation of the reflective surface can be created, with, as discussed above, each region of the reflective surface being a local region having a normal that bisects the vectors from the center of that region to the center of the user's eye and to the center of a pixel in the display surface. As also discussed above, the radii of curvature of regions surrounding a pixel reflection can be controlled so that a collimated (or near collimated) image reaches the user across the field of view. Through computer-based iterations, changeable parameters (e.g., local normals, local curvatures, local spatial locations) can be adjusted until a combination (set) of parameters is identified that provides a desired level of optical performance over the field of view, as well as a manufacturable design which is aesthetically acceptable.

During use, the non-symmetrical FS/UWA/RO surface which, in certain embodiments, is constructed from a splined surface of multiple local regions of focus, forms a virtual image of the at least one light emitting surface of the image display system that is stretched across a wide field of view. The FS/UWA/RO surface may be thought of as a progressive mirror or progressive curved beam splitter or a free-form mirror or reflector. As the eye scans across the field of view, both horizontally and vertically, the curved FS/UWA/RO surface shines different portions of the at least one light-emitting surface of the image display system into the user's eye. In various embodiments, the overall optical system is manufacturable in large quantities at low cost while maintaining an image quality commensurate with typical human visual resolution.

In terms of the overall structure of the HMD, Table 1 sets forth representative, non-limiting, examples of the parameters which a HMD display constructed in accordance with the present disclosure will typically meet. In addition, the HMD displays disclosed herein will typically have an inter-pixel distance that is small enough to ensure that a cogent image is established in the visual plane of the user.

Various features that can be included in the head-mounted displays disclosed herein include, without limitation, the following, some of which have been referenced above:

(1) In some embodiments, one or more Fresnel lenses may be used to modify the diopter characteristics of the light beam emanating from the display surface.

(2) In some embodiments, the reflective optical surface may be semi-transparent, allowing light to come in from the external environment. The internal display-generated images can then overlay the external image. The two images may be aligned through the use of localization equipment, such as gyroscopes, cameras, and software manipulation of the computer-generated imagery so that the virtual images are at the appropriate locations in the external environment. In particular, a camera, accelerometer, and/or gyroscopes can be used to assist the apparatus in registering where it is in the physical reality and to superimpose its images on the outside view. In these embodiments, the balance between the relative transmittance and reflectance of the reflective optical surface can be selected to provide the user with overlaid images with appropriate brightness characteristics. Also in these embodiments, the real world image and the computer-generated image can appear to both be at approximately the same apparent distance, so that the eye can focus on both images at once.

(3) In some embodiments, the reflective optical surface is kept as thin as possible in order minimize effects on the position or focus of external light passing through the surface.

(4) In some embodiments, the head-mounted display apparatus provides a field of view to each eye of at least 100 degrees, at least 150 degrees, or at least 200 degrees.

(5) In some embodiments, the static field of view provided by the head-mounted display to each eye does not overlap the user's nose by any large degree.

(6) In some embodiments, the reflective optical surface may employ a progressive transition of its optical prescription across the field of view to maintain focus on the available display area.

(7) In some embodiments, ray tracing may be used to customize apparatus parameters for a particular implementation, such as military training, flight simulation, gaming and other commercial applications.

(8) In some embodiments, the reflective optical surface and/or the surface of the display, as well as the curvatures of lenses (when used), and the distances between the display and the reflective optical surface and between the reflective optical surface and the eye, can be manipulated with respect to a Modulation Transfer Function (MTF) specification at the retina and/or the fovea.

(9) In some embodiments, the HMDs disclosed herein can be implemented in applications such as, but not limited to, sniper detection, commercial training, military training and operations, and CAD manufacturing.

Once designed, the reflective optical surfaces disclosed herein (e.g., the FS/UWA/RO surfaces) can be produced e.g., manufactured in quantity, using a variety of techniques and a variety of materials now known or subsequently developed. For example, the surfaces can be made from plastic materials which have been metalized to be suitably reflective. Polished plastic or glass materials can also be used. For "augmented reality" applications, the reflective optical surfaces can be constructed from a transmissive material with embedded small reflectors thus reflecting a portion of an incident wavefront while allowing transmission of light through the material.

For prototype parts, an acrylic plastic (e.g., plexiglas) may be used with the part being formed by diamond turning. For production parts, either acrylic or polycarbonate may, for example, be used with the part being formed by, for example, injection molding techniques. The reflective optical surface may be described as a detailed Computer Aided Drafting (CAD) description or as a non-uniform rational B-Spline NURBS surface, which can be converted into a CAD description. Having a CAD file may allow the device to be made using 3-D printing, where the CAD description results in a 3D object directly, without requiring machining.

The mathematical techniques discussed above can be encoded in various programming environments and/or programming languages, now known or subsequently developed. A currently preferred programming environment is the Java language running in the Eclipse Programmer's interface. Other programming environments such as Microsoft Visual C# can also be used if desired. Calculations can also be performed using the Mathcad platform marketed by PTC of Needham, Mass., and/or the Matlab platform from MathWorks, Inc., of Natick, Mass. The resulting programs can be stored on a hard drive, memory stick, CD, or similar device. The procedures can be performed using typical desktop computing equipment available from a variety of vendors, e.g., DELL, HP, TOSHIBA, etc. Alternatively, more powerful computing equipment can be used including "cloud" computing if desired.

A variety of modifications that do not depart from the scope and spirit of the invention will be evident to persons of ordinary skill in the art from the foregoing disclosure. For example, although reflective optical surfaces which provide the user with a large field of view, e.g., a field of view greater than or equal to 100°, 150°, or 200°, constitute an advantageous embodiment of the design aspects of the invention, the computer-based methods and systems for designing reflective optical surfaces disclosed herein can also be used to create surfaces having smaller fields of view. The following claims are intended to cover these and other modifications, variations, and equivalents of the specific embodiments set forth herein.

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated for carrying out this invention, but that all embodiments falling within the scope of the appended claims are considered. Moreover, unless specifically stated, any use of the terms first, second, etc., does not denote any order or importance, but rather the terms first, second, etc., are used to distinguish one element from another.

TABLE 1

| Name | Description | Units | Minimum | Maximum |
|---|---|---|---|---|
| Distance of reflective surface from eye | | mm | 10 | 400 |
| Distance of reflective surface from display | | mm | 10 | 400 |
| Display size | Horizontal | mm | 9 | 100 |
| | Vertical | mm | 9 | 100 |
| Display resolution | Horizontal | pixels | 640 | 1920+ |
| | Vertical | pixels | 480 | 1080+ |
| HMD weight | | grams | 1 | 1000 |
| HMD size | Distance in front of face | mm | 10 | 140 |
| Human pupil size | | mm | 3 to 4 | 5 to 9 |
| Size of reflective surface | e.g., less than the width of the head/2 | mm | 30 | 78 |
| Number of reflective surfaces | | units | 1 | 3+ |
| Maximum illumination to the eye | e.g., bright enough to allow viewing on bright sunny day | fc, footcandles | 5,000 | 10,000 |
| Battery life | | hours | 3 | 4 |
| Optical resolution | Largest angular blur | arcminute RMS blur diameter | 1 | 10 |
| | Estimated number of line pairs of resolution | | 1 | 5 |
| Maximum variation in apparent brightness of the image | | Percent | 0 | 20 |
| Maximum image distortion | | Percent | 0 | 5 |
| Estimated maximum derivative of brightness | | Percent/degree | 0 | 5 |

What is claimed is:

1. A head-mounted display apparatus comprising:
(I) a frame adapted to be mounted on a user's head;
(II) an image display system supported by the frame; and
(III) a reflective optical surface supported by the frame, the reflective optical surface being a continuous surface that is not rotationally symmetric about any coordinate axis of a three-dimensional Cartesian coordinate system;
wherein:
(a) the image display system includes at least one light-emitting surface;
(b) the reflective optical surface is configured to reflect spatially-separated virtual images of spatially-separated portions of the at least one light-emitting surface to perform non-pupil forming, in-focus for near-to-the eye viewing of spatially-separated reflected virtual images, at least one of the spatially-separated virtual images being angularly separated from at least one other of the spatially-separated virtual images by an angular separation of at least 100 degrees, said angular separation being measured from the center of rotation of a single eye of the user; and
(c) at least one point of the reflective optical surface being angularly separated from at least one other point of the reflective optical surface by at least 100 degrees, said angular separation being measured from the center of rotation of the single eye of the user;
(d) wherein the angular separation is up to a widest field of view for a single eye.

2. The head-mounted display apparatus of claim 1 wherein the reflective optical surface is configured to reflect:
the at least one of the spatially-separated virtual images angularly separated from the at least one other of the spatially-separated virtual images by at least 150 degrees;
wherein the at least one point of the reflective optical surface is angularly separated from the at least one other point of the reflective optical surface by at least 150 degrees.

3. The head-mounted display apparatus of claim 1 wherein the reflective optical surface is configured to reflect:
the at least one of the spatially-separated virtual images angularly separated from the at least one other of the spatially-separated virtual images by at least 200 degrees;
wherein the at least one point of the reflective optical surface is angularly separated from the at least one other point of the reflective optical surface by at least 200 degrees;

wherein the angular separation is up to a widest field of view for the single eye.

4. The head-mounted display apparatus of claim 1 wherein the reflective optical surface being configured to reflect:
the at least one of the spatially-separated virtual images along a direction of gaze which passes through the at least one point of the reflective optical surface; and
the at least one other of the spatially-separated virtual images along a direction of gaze which passes through the at least one other point of the reflective optical surface.

5. The head-mounted display apparatus of claim 1 wherein the reflective optical surface is semi-transparent.

6. The head-mounted display apparatus of claim 1 wherein the apparatus has a single reflective optical surface.

7. The head-mounted display apparatus of claim 1 wherein the apparatus has two reflective optical surfaces, one for each of the user's eyes.

8. The head-mounted display apparatus of claim 1 wherein the angular separation up to a widest field of view for a single eye is up to about 200 degrees.

9. A head-mounted display apparatus comprising:
(I) a frame adapted to be mounted on a user's head;
(II) an image display system supported by the frame and comprising at least one light-emitting surface; and
(III) a free-space, ultra-wide angle, reflective optical surface, the reflective optical surface being a continuous surface, supported by the frame is configured to reflect spatially-separated virtual images of spatially-separated portions of the at least one light-emitting surface to perform non-pupil forming, in-focus for near-to-the eye viewing of spatially-separated reflected virtual images, at least one of the spatially-separated virtual images being angularly separated from at least one other of the spatially-separated virtual images by an angular separation of at least 100 degrees, the angular separation being measured from a center of rotation of a single eye of the user;
(IV) wherein the angular separation is up to a widest field of view for a single eye.

10. The head-mounted display apparatus of claim 9 wherein the at least one of the spatially-separated virtual images is angularly separated from the at least one other of the spatially-separated virtual images by at least 150 degrees.

11. The head-mounted display apparatus of claim 9 wherein the at least one of the spatially-separated virtual images is angularly separated from the at least one other of the spatially-separated virtual images by at least 200 degrees, and wherein the angular separation is up to a widest field of view of a single eye.

12. The head-mounted display apparatus of claim 9 further comprising:
a second free-space, ultra-wide angle, reflective optical surface;
wherein the image display system comprises a first image display device and a second image display device and the free-space, ultra-wide angle, reflective optical surface is a first free-space, ultra-wide angle, reflective optical surface in fixed relationship with the first image display device; and
wherein the second free-space, ultra-wide angle, reflective optical surface is in fixed relationship with the second image display device.

13. The head-mounted display apparatus of claim 9 wherein the free-space, ultra-wide angle, reflective optical surface is semi-transparent.

14. The head-mounted display apparatus of claim 9 wherein the free-space, ultra-wide angle, reflective optical surface is configured to at least partially collimate light emitted from the at least one light-emitting surface.

15. The head-mounted display apparatus of claim 9 wherein the angular separation up to a widest field of view for a single eye is up to about 200 degrees.

16. A head-mounted display apparatus comprising:
(I) a frame adapted to be mounted on a user's head;
(II) an image display system supported by the frame; and
(III) a reflective surface supported by the frame, the reflective surface providing non-pupil forming, in-focus for near-to-the eye viewing of spatially-separated reflected virtual images over a field. of view to a nominal user of at least 200 degrees;
wherein:
(a) the image display system includes at least one light-emitting surface which includes at least first and second, spatially-separated, light-emitting regions having, respectively, first and second information contents;
(b) the reflective surface comprises at least first and second, spatially-separated, reflective regions having, respectively, first and second surface normals which point in different directions;
(c) for at least one direction of gaze of an eye of the nominal user, light from the first light-emitting region reflects off of the first reflective region and enters said eye to form a visible virtual image of the first information content;
(d) for at least one direction of gaze of said eye, light from the second light-emitting region reflects off of the second reflective region and enters said eye to form a visible virtual image of the second information content;
(e) for at least one direction of gaze of said eye, the light from the first light-emitting region reflects off of the first reflective region and enters said eye to form the visible virtual image of the first information content and the light from the second light-emitting region reflects off of the second reflective region and does not enter said eye; and
(f) wherein the angular separation is up to a widest field of view of a single eye.

17. The head-mounted display apparatus of claim 16 wherein the image display system is a first image display system and the reflective surface is a first reflective surface; and the apparatus further comprises a second image display system and a second reflective surface wherein the first reflective surface is in fixed relationship with the first image display system and the second reflective surface is in fixed relationship with the second image display system.

18. The head-mounted display apparatus of claim 16 wherein the reflective surface is semi-transparent.

19. The head-mounted display apparatus of claim 16 wherein the reflective surface is configured to at least partially collimate light emitted from the at least one light-emitting surface.

20. A computer-based method for designing a reflective optical surface for use in a head-mounted display which includes an image display system having a plurality of content areas, the method comprising using one or more computers to perform the steps of:
(a) dividing, by the one or more computers, the reflective optical surface into a plurality of local reflective regions, each local reflective region having a surface normal;
(b) associating, by the one or more computers, the each local reflective region of the reflective optical surface with a single content area of the image display system, each content area being associated with at least one local reflective region; and (c) adjusting, by the one or more computers, a configuration of the reflective optical surface so that each of the surface normals bisects the following two vectors:
   (1) a vector from the local reflective region to its associated content area; and
   (2) a vector from the local reflective region to the location of a center of rotation of a nominal user's eye.

21. The method of claim 20 wherein the configuration of the reflective optical surface is adjusted to at least partially collimate light emitted from the image display system.

22. The method of claim 20 further comprising producing the reflective optical surface.

23. A computer program embodied in a tangible computer readable medium for performing the method of claim 20.

24. A computer system programmed to perform the method of claim 20.

25. A system comprising:
(a) a processor;
(b) a memory unit coupled to the processor, said memory unit storing a computer program which includes programming instructions for performing the method of claim 20.

26. A reflective optical surface comprising:
a surface having a plurality of local reflective regions providing non-pupil forming, in-focus for near-to-the eye viewing of spatially-separated reflected virtual images over a horizontal field of view up to 100 degrees, wherein
each local reflective region having a surface normal such that each of the surface normals is configured to bisect both (1) a first vector from the local reflective region to its associated content area of a display device and (2) a second vector from the local reflective region to the location of a center of rotation of the user's eye; and
each local reflective region is configured to reflect a spatially-separated virtual image from a light-emitting surface, at least one of the spatially-separated virtual images angularly separated from at least one other of the spatially-separated virtual images by an angular separation of up to 100 degrees, said angular separation being measured from the center of rotation of the user's eye: and
wherein the angular separation is up to a widest field of view for a direction of gaze.

27. The head-mounted display apparatus of claim 26 wherein the angular separation up to a widest field of view for a single eye is up to about 200 degrees.

\* \* \* \* \*